US006960550B2

(12) United States Patent
Waymouth et al.

(10) Patent No.: US 6,960,550 B2
(45) Date of Patent: *Nov. 1, 2005

(54) CATALYST SYSTEMS FOR HIGH MELTING THERMOPLASTIC ELASTOMERIC α-OLEFIN POLYMERS AND PLASTOMERS

(75) Inventors: Robert M. Waymouth, Palo Alto, CA (US); Raisa Kravchenko, Wilmington, DE (US); Larry L. Bendig, Aurora, IL (US); Eric J. Moore, Carol Stream, IL (US); Charles L. Myers, Palatine, IL (US); Roger W. Quan, Vernon Hills, IL (US); Andreas B. Ernst, Naperville, IL (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 10/392,088

(22) Filed: Mar. 18, 2003

(65) Prior Publication Data

US 2003/0195308 A1 Oct. 16, 2003

Related U.S. Application Data

(62) Division of application No. 09/669,411, filed on Sep. 25, 2000, now Pat. No. 6,559,262, which is a division of application No. 09/097,234, filed on Jun. 12, 1998, now Pat. No. 6,160,064.
(60) Provisional application No. 60/054,335, filed on Jun. 14, 1997, provisional application No. 60/050,105, filed on Jun. 20, 1997, provisional application No. 60/071,050, filed on Jan. 9, 1998, and provisional application No. 60/050,393, filed on Jun. 19, 1997.

(51) Int. Cl.[7] ............................... C08F 4/64; C08F 4/68
(52) U.S. Cl. ...................... 502/152; 502/103; 502/117; 526/160; 526/170; 526/943; 556/43; 556/52; 556/53
(58) Field of Search ............................ 502/103, 117, 502/152; 526/160, 170, 943; 556/52, 53, 43

(56) References Cited

U.S. PATENT DOCUMENTS

| | | | |
|---|---|---|---|
| 3,873,642 A | 3/1975 | Jezl | 260/878 |
| 4,334,040 A | 6/1982 | Fujii et al. | 525/321 |
| 4,668,752 A | 5/1987 | Tominari et al. | 526/348.2 |
| 4,677,172 A | 6/1987 | Zimmerman et al. | 526/159 |
| 4,792,595 A | 12/1988 | Cozewith et al. | 526/348 |
| 4,797,461 A | 1/1989 | Aubanel et al. | 526/348.6 |
| 4,871,705 A | 10/1989 | Hoel | 502/117 |
| 4,981,760 A | 1/1991 | Naito et al. | 428/523 |
| 5,001,205 A | 3/1991 | Hoel | 526/128 |
| 5,055,535 A | 10/1991 | Spitz et al. | 526/142 |
| 5,086,134 A | 2/1992 | Antberg et al. | 526/126 |
| 5,192,732 A | 3/1993 | Duranel et al. | 502/126 |
| 5,229,478 A | 7/1993 | Floyd et al. | 526/160 |
| 5,278,272 A | 1/1994 | Lai et al. | 526/348.5 |
| 5,459,217 A | 10/1995 | Todo et al. | 526/348.1 |
| 5,475,075 A | 12/1995 | Brant et al. | 526/348.3 |
| 5,491,207 A | 2/1996 | Hoel | 526/129 |
| 5,585,448 A | 12/1996 | Resconi et al. | 526/170 |
| 5,594,080 A * | 1/1997 | Waymouth et al. | 526/126 |
| 5,747,621 A * | 5/1998 | Resconi et al. | 526/351 |
| 6,160,064 A | 12/2000 | Waymouth et al. | |
| 6,169,151 B1 | 1/2001 | Waymouth et al. | |
| 6,380,341 B1 | 4/2002 | Waymouth et al. | |
| 6,479,424 B1 | 11/2002 | Ernst et al. | |
| 6,479,685 B2 * | 11/2002 | Waymouth et al. | 556/53 |
| 6,518,378 B2 | 2/2003 | Waymouth et al. | |
| 6,559,262 B1 | 5/2003 | Waymouth et al. | |

OTHER PUBLICATIONS

Quirk, Roderic P., Transition Metal Catalyzed Polymerizations, 1988, Cambridge University Press, Cambridge, pp. 719–728.
Spitz, R., et al., Propene Polymerization with MgCl$_2$ supported Ziegler catalysts: Activation by hydrogen and ethylene, 1988, Makromol. Chem. 189, pp. 1043–1050.
Valvassori, A., et al., Kinetics of the Ethylene–Propylene Copolymerization, 1963, Makoromol. Chem. 161, pp. 46–62.
Brintzinger, H, et al., Stereospecific Olefin Polymerization with Chiral Metallocene Catalysts, 1995, Angew. Chem Int. Ed. Engl. 34, pp. 1143–1170.
Pasquet, v., and Spitz, R., Irreversible activation effects in ethylene polymerization, 1993, Makromol. Chem. 194, pp. 451–461.
Busico, V., et al., Siegler–Natta oligomerization of 1-alkenes: a catalyst's "fingerprint", 2, Preliminary results of propene hydrooligomerization in the presence of the homogeneous isospecific catalyst system rac–(EBI) ZrcCl$_2$/MAO, 1993, Makromol. Chem. , Rapid Commun. 14, pp. 97–103.
Herfert, N., et al., Elementary processes of the Xiegler catalysis, 7, Ethylene, α–olefin and norbornene copolymerization with the stereorigid catalyst stems iPr[FluCp]ZrCl$_2$/MAO, 1993, Makromol. Chem. 194, pp. 3167–3182.
Koivumaki, J. and Seppala, J., Observations on the Rate Enhancement Effect with MgCl$_2$/TiCl$_4$ and Cp$_2$ZrCl$_2$ Catalyst system upon 1–Hexene Addition, 1993, Macromolecules 26 No. 21.
Corradini, P., et al., Hydrooligomerization of propene: a "fingerprint" of a Ziegler–Natta catayst, 2, A reinterpretation of result for isospecific homogeneous systems, 1992, Makromol. Chem. , Rapid Commun. 13, pp. 21–24.
Busico, V., et al., Hydrooligomerization of propene: a "fingerprint" of a Ziegler–Natta catayst, 1, Preliminary results for MgCl$_2$ supported systems, 1992, Makromol. Chem. , Rapid Commun. 13, pp. 15–20.
Ystenes, M., Predictions from the Trigger Mechanism for Ziergler–Natta Polymerization of α–olefins, 1993, Makromol. Chem. , Makromol. Symp. 66, pp. 71–82.

* cited by examiner

Primary Examiner—Roberto Rabago
(74) Attorney, Agent, or Firm—James R. Henes; David P. Yusko

(57) ABSTRACT

A metallocene catalyst system component for polymerization of olefins includes at least one 2-arylindenyl ligand substituted on the 1-position by a substituted or unsubstituted alkyl, alkylsilyl, or aryl substituent of 1 to 30 carbon atoms.

11 Claims, No Drawings

CATALYST SYSTEMS FOR HIGH MELTING THERMOPLASTIC ELASTOMERIC α-OLEFIN POLYMERS AND PLASTOMERS

CROSS REFERENCE TO RELATED APPLICATIONS

This application is a divisional of U.S. application Ser. No. 09/669,411 filed Sep. 25, 2000, now U.S. Pat. No. 6,559,262, which is a division of U.S. application Ser. No. 09/097,234 filed Jun. 12, 1998, now U.S. Pat. No. 6,160,064, and claims benefit of U.S. Provisional Applications No. 60/054,335 filed Jun. 14, 1997, 60/050393 filed Jun. 19, 1997, 60/050,105 filed Jun. 20, 1997, and 60/071,050 filed Jan. 9, 1998, all incorporated by reference herein.

STATEMENT REGARDING FEDERALLY SPONSORED RESEARCH OR DEVELOPMENT

This invention, in part, was made with Government support under ATP grant 70NANB5H1140 awarded by the National Institute of Standards and Technology. The United States Government may have certain rights in this invention.

TECHNICAL FIELD

This invention relates generally to processes for production of α-olefin polymers using unbridged fluxional metallocenes, primarily substituted aryl indenyl metallocenes, and more particularly to use of unbridged, fluxional, cyclopentadienyl or indenyl metallocene catalysts and catalyst systems in methods of production of high melting point olefin homo- and co-polymers, particularly elastomeric crystalline and amorphous block homo- and co-polymers of alpha olefins. More specifically, the invention is directed to: (1) the discovery and catalytic process use of a Polymerization Rate-Enhancement effect (PRE effect) in polymerization processes which involve the addition of minor amounts of ethylene to the polymerization system to produce polymers having properties ranging from crystalline thermoplastics to high melting point thermoplastic elastomers to amorphous gum elastomers, and methods for increasing polymerization production rates and polymer molecular weight; (2) the discovery and catalytic process use of an Elastomeric Property-Enhancement effect (EPE effect) in which small quantities of ethylene added to the polymerization system activates selected metallocene catalyst systems, which otherwise do not produce elastomeric polymers, to produce elastomeric polymers; and (3) novel substituted aryl indenyl metallocene catalysts.

BACKGROUND

Crystalline, amorphous, and elastic polypropylenes are known. Crystalline polypropylenes are generally regarded as comprising of predominantly isotactic or syndiotactic structures and amorphous polypropylene is regarded as comprising predominantly of an atactic structure. U.S. Pat. Nos. 3,112,300 and 3,112,301 both of Natta, et. al. describe isotactic and prevailingly isotactic polypropylene.

U.S. Pat. No. 3,175,199 to Natta et al. describes an elastomeric polypropylene which can be fractioned out of a polymer mixture containing prevailingly isotactic and atactic polypropylenes. When separated from the polymer mixture, a fraction of this polymer showed elastomeric properties which were attributed to a stereoblock structure comprising alternating blocks of isotactic and atactic stereosequences. U.S. Pat. No. 4,335,225 discloses a fractionable elastomeric polypropylene with a broad molecular weight distribution.

Elastomeric polypropylenes with narrow molecular weight distributions are also known which are produced in the presence of bridged metallocene catalysts. Polymers of this type were described by Chien et. al. in (J. Am. Chem. Soc. 1991, 113, 8569–8570), but their low melting point renders them unsuitable for certain applications. In addition, the activities of these catalyst systems are low U.S. Pat. No. 5,594,080 discloses an unbridged, fluxional metallocene catalyst system useful for the production of elastomeric polyolefins. These fluxional, unbridged catalysts can interconvert between geometric states on the time scale of the growth of a single polymer chain in order to produce isotactic, atactic stereoblock polyalphaolefins with useful elastomeric properties. Polyolefins produced with these fluxional catalysts systems can have a range of properties, from amorphous gum elastomers to useful thermoplastic elastomers to non-elastomeric thermoplastics.

The commercial utility of a catalyst system is closely tied to the polymerization activity. Processes that lead to an increase in activity of a polymerization system are of considerable practical utility. The activity of a polymerization system can in some cases be influenced by additives to the polymerization system. For example for both classical Ziegler-Natta systems as well as metallocene systems, the addition of hydrogen can result in an increase in propylene polymerization activity, see Pasquet, V., et al., Makromol. Chem. 1993, 194, 451–461 and references cited therein. One of the explanations for the hydrogen effect is the reactivation of the dormant sites resulting from 2,1-propylene misinsertions, see Corradini, P., et al., Makromol. Chem., Rapid Commun. 1992, 13, 15–20; Corradini, P., et al., Makromol. Chem., Rapid Commun. 1992, 13, 21–24; and Busico, V., et al., Makromol. Chem., Rapid Commun. 1993, 14, 97–103. Since hydrogen is also a chain transfer agent, the addition of hydrogen decreases the molecular weight, which limits the practical utility of the hydrogen effect where high molecular weight polymers are desired.

Activation of ethylene polymerization systems by the addition of small amounts of an alpha olefin is also known, see for example Brintzinger, H., et. al. Angew. Chemie, Int. Ed. Engl. 1995, 34, 1143–1170. This so-called "comonomer effect" (see Spitz, R., et al. Makromol. Chem. 1988, 189, 1043–1050) is useful in a process for the synthesis of ethylene polymers, but not for alpha olefin polymers. Hefert, N., et. al. Makromol. Chem. 1993 194, 3167–3182 report no effect of hexene on the rate of propene polymerization with a metallocene catalyst. Several explanations have been forwarded to explain this "comonomer effect" including a "trigger mechanism" (Ystenes, M., Makromol. Chem. "Macromolecular Symposia" 1993, 66, 71–81) and improved rates of diffusion due to the solubilization of active centers by incorporation of comonomer (see Koivumaki. J., et al. Macromolecules 1993, 26, 5535–5538).

Activation of propylene polymerization systems in the presence of 5% ethylene have been previously reported for magnesium chloride supported Ti-based catalysts by Spitz, R., et al. in Makromol. Chem. 1988, 189, 1043–1050 and in Spitz, R., et al. in "Transition Metal Catalyzed Polymerization", Quirk, R. P., Ed., Cambridge Univ. Press 1988, pp. 719–728, and with V-based Ziegler catalysts by Valvassori, A., et al. in Makromol. Chem. 1963, 61, 46–62. While such "synergistic effects" have been observed with classical Ziegler-Natta catalyst systems, Koivumaki et. al. point out that such synergistic effects do not work for homogeneous metallocene systems (see Koivumaki, J., et al. Macromolecules 1993, 26, 5535–5538).

Accordingly, there is a need for processes to improve the activity of metallocene catalysts systems capable of producing elastomeric polypropylenes of high molecular weight with high melting points.

THE INVENTION SUMMARY, OBJECTS AND ADVANTAGES

We have discovered that the activity of fluxional unbridged metallocene polymerization catalysts containing at least one 2-arylindene ligand may be increased by the addition of small (typically 0.1–10 wt. %) amounts of ethylene to the polymerization system. In particular, the addition of ethylene to a propylene polymerization system derived from unbridged metallocene catalysts containing at least one 2-arylindene ligand results in a significant increase (up to ten-fold or above) in catalyst activity. We term this increase in activity the Polymerization Rate Enhancement effect (PRE), which can be measured in terms of an Ethylene Enhancement Factor (EEF) as a dimensionless ratio. Also, the molecular weight of the produced polymers may increase in the presence of ethylene. The amount of ethylene included in the reaction system can be selected and controlled to be so small as to result in essentially minimal (<2 mole %) incorporation of ethylene units into the polymer, yet surprisingly results in a significant, disproportionately large increase in polymerization activity. More specifically, by addition of small amounts of ethylene into polypropylene reaction systems, an unexpectedly large (order of magnitude or more) increase in activity is achieved to produce elastomeric products.

Thus, in a first aspect of this invention, elastomeric olefin polymers are formed using unbridged fluxional, metallocene-based, catalyst systems in a polymerization process in which an activity-enhancing amount of ethylene is incorporated into the polymerization feed. This effect is herein termed the PRE effect, for Polymerization Rate-Enhancement effect, and is quantified as a dimensionless number in the range of from about 1.1 to about 10 or above, called the EEF for Ethylene Enhancement Factor. Typically, useful PRE (activity-enhancing) amounts of ethylene are above about 0.1 wt. % in the feed. Amounts of ethylene to generate the PRE effect may be greater than 0.5 wt. % and preferably range up to about 2 wt. %. However, if a polymer with more ethylene is desired, additional ethylene may be incorporated into the polymerization feed, including up to 10 to about 50 mole % based on olefin units.

Even though ethylene may be introduced into a polymer of this invention, only an activity-enhancing amount of ethylene for PRE is required, i.e., to increase the activity of the fluxional, metallocene-based, catalyst. Thus, a second important aspect of this invention is the ability to use a PRE activity-enhancing amount of ethylene in an olefin polymerization without substantially affecting the physical properties of the elastomer. Preferred elastomeric polymers containing ethylene linkages made according to this invention have high melting temperatures (as measured by DSC) above 80° C., preferably about 100° C., including in the range of from about 120° C. to about 140° C. or above.

In a third important aspect of this invention, we have discovered the ability to produce olefin (preferably propylene) elastomers through incorporation of ethylene using unbridged fluxional catalyst systems which may not otherwise produce acceptable elastomeric homopolymers. This effect is herein termed the EPE effect, for Elastomeric Property-Enhancing effect. The Elastomeric Property-Enhancing amount of ethylene required to produce such elastomers typically overlaps the aforesaid PRE activity-enhancing amount. Incorporation of up to about 5 mole % or more of ethylene typically will produce an elastomeric polymer using such catalyst systems. Typical useful amounts of incorporated ethylene include about 1 to 3 mole %. Again, a preferred polymer of this invention retains sufficient crystallinity to provide a high melting point (by DSC) of above 80° C., preferably above 100° C., including in the range of from about 120° C. to about 140° C. and above. For example, the novel Catalyst D of this invention bis[2-(3,5-trifluoromethylphenyl)indenyl] zirconium dichloride produces an elastomeric polypropylene with 9% ethylene incorporated in the polymer with a $T_m$ of 100° C. Even with ethylene contents of up to about 10 mole % or more, polymers of this invention typically show melting temperatures of 80° C. and above in contrast to conventional propylene-ethylene copolymer elastomers produced by conventional catalysts which have a lower melting temperature.

Polymers of this invention show a broad melting range by DSC analysis and exhibit good elastic recoveries. The conventional measurement of the melting point ($T_m$) is the peak (or inverse peak) in the DSC curve. Polymers of this invention also typically retain properties after thermocycling of up to 100° C. and above. By way of example, such polymers retain transparency after such a heat treatment and do not become opaque.

A preferred elastomeric α-olefin polymer of this invention is a propylene polymer in which an amount of ethylene is incorporated during polylmerization such that the resulting elastomeric propylene polymer maintains sufficient physical properties at elevated temperature (such as melting temperature) to permit steam sterilization without deformation of a shaped article fabricated from the polymer. Typical steam sterilization conditions are maintenance of a temperature of 121° C. or above at a 2 atmosphere steam pressure.

Further, in polymerization systems which produce thermoplastic crystalline propylene polymers, introduction of ethylene merely reduces the melting point. In contrast, the EPE effect of this invention unexpectedly results in converting the polymers to true elastomers while providing a method of control over melting point and retention of properties after thermocycling by adjustment of the ethylene content in the feed and end product polymers.

As noted above, the class of metallocenes of this invention is defined as "fluxional", meaning that the geometry of such metallocene can change between two isomeric states. This change in configuration occurs on a time scale that is slower than the rate of olefin insertion, but faster than the average time to construct (polymerize) a single polymer chain. The fluxional catalyst structure is such that upon isomerization the catalyst symmetry alternates between states that have different coordination geometries and thus different steroselectivities. The catalyst remains in that geometric symmetry for a time sufficient to be characterizable as a "state", before rotating or otherwise transforming to the other geometry or state. This geometric or state alternation can be controlled by selecting ligand type and structure to control rotation of the ligands on the ligand-metal bond. Further, through control of polymerization, precise control of the physical properties of the resulting polymers can be achieved.

This invention includes novel processes for tailoring block size distribution and resulting properties of the polymer such as: tacticity, molecular weight, molecular weight distribution, productivity, melt flow rate, melting point, crystallite aspect ratio, tensile set and tensile strength by varying the structure of the catalyst, the conditions of the polymerization reaction, and the solvents, reactants, additives and adjuvants employed, the latter adjuvants including use of ethylene in the PRE and EPE effect processes described above and in the examples.

The catalyst system of the present invention consists of the transition metal component metallocene in the presence of an appropriate cocatalyst. In broad aspect, the transition metal compounds have the formula:

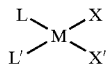

Formula 1 in which M is a Group 3, 4 or 5 Transition metal, a Lanthanide or an Actinide, X and X' are the same or different uninegative ligands, such as but not limited to hydride, halogen, hydrocarbyl, halohydrocarbyl, amine, amide, or borohydride substituents (preferably halogen, alkoxide, or $C_1$ to $C_7$ hydrocarbyl), and L and L' are the same or different substituted cyclopentadienyl or indenyl ligands, in combination with an appropriate cocatalyst. Exemplary preferred Transition Metals include Titanium, Hafnium, Vanadium, and, most preferably, Zirconium. An exemplary Group 3 metal is Yttrium, a Lanthanide is Samarium, and an Actinide is Thorium.

The ligands L and L' may be any mononuclear or polynuclear hydrocarbyl or silahydrocarbyl, typically a substituted cyclopentadienyl ring. Preferably L and L' have the formula:

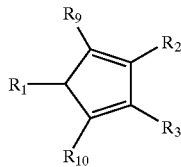

Formula 2 where $R_1$, $R_2$ and $R_3$ may be the same or different substituted or unsubstituted alkyl, alkylsilyl or aryl substituents of 1 to about 30 carbon atoms, and $R_9$ and $R_{10}$ may be the same or different hydrogen, or substituted or unsubstituted alkyl, alkylsilyl, or aryl substituents of 1 to about 30 carbon atoms.

Ligands of this general structure include cyclopentadiene, and pentamethylcyclopentadiene. Other ligands L and L' of Formula 2 for the production of propylene-ethylene copolymers include substituted cyclopentadienes of the general formula:

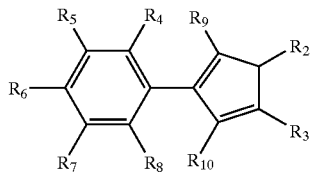

Formula 3 where $R_4$–$R_{10}$ have the same definition as $R_9$ and $R_{10}$ above. Preferred cyclopentadienes of Formula 3 include 3,4-dimethyl-1-phenyl-1,3-cyclopentadiene ($R_2$=$R_3$=$CH_3$, and $R_6$=H), 3,4-dimethyl-1-p-tolyl-1,3-cyclopentadiene ($R_2$=$R_3$=$CH_3$, and $R_6$=$CH_3$), 3,4-dimethyl-1-(3,5-bis (trifluoromethyl)phenyl)-1,3-cyclopentadiene ($R_2$=$R_3$=$CH_3$, and $R_6$=$CH_3$), and 3,4-dimethyl-1-(4-tert-butylphenyl)-1,3-cyclopentadiene ($R_2$=$R_3$=$CH_3$, and $R_6$=tBu).

Alternately preferred L and L' of Formula 1 include ligands wherein $R_1$ is an aryl group, such as a substituted phenyl, biphenyl, or naphthyl group, and $R_2$ and $R_3$ are connected as part of a ring of three or more carbon atoms. Especially preferred for L or L' of Formula 1 for producing the homopolymers of this invention is a 2-arylindene of formula:

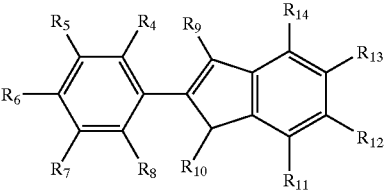

Formula 4

Where $R_4$, $R_5$, $R_6$, $R_7$, $R_8$, $R_9$, $R_{10}$, $R_{11}$, $R_{12}$, $R_{13}$, and $R_{14}$ may be the same or different hydrogen, halogen, aryl, hydrocarbyl, silahydrocarbyl, or halohydrocarbyl substituents. That is, $R_1$ of Formula 2 is $R_4$–$R_8$-substituted benzene, and $R_2$, $R_3$ are cyclized in a 6-carbon ring to form the indene moiety. Particularly preferred 2-aryl indenes include: 2-phenylindene: 1-methyl-2-phenyl indene; 2-(3,5-dimethylphenyl)indene; 2-(3,5-bis-triflouromethylphenyl) indene; 2-(3,5-bis-tertbutylphenyl)indene; 2-(3,5-bis trimethylsilylphenyl)indene; 2-(4,-fluorophenyl)indene; 2-(2,3,4,5-tetrafluorophenyl) indene; 2-(2,3,4,5,6-pentaflourophenyl)indene; 2-(1-naphthyl)indene; 2-(2-naphthyl)indene; 2-[(4-phenyl)phenyl]indene; and 2-[(3-phenyl)phenyl]indene.

Preferred metallocenes according to the present invention include:

bis(2-phenylindenyl)zirconium dichloride;

bis(2-phenylindenyl)zirconium dimethyl;

bis(1-methyl-2-phenylindenyl)zirconium dichloride;

bis(1-methyl-2-phenylindenyl)zirconium dimethyl;

bis[2-(3,5-dimethylphenyl indenyl]zirconium dichloride;

bis[2-(3,5-bis-trifluoromethylphenyl)indenyl]zirconium dichloride;

bis[2-(3,5-bis-tertbutylphenyl)indenyl]zirconium dichloride;

bis[2-(3,5-bis-trimethylsilylphenyl)indenyl]zirconium dichloride;

bis[2-(4,-fluorophenyl)indenyl]zirconium dichloride;

bis[2-(2,3,4,5,-tetraflorophenyl)indenyl]zirconium dichloride;

bis(2-(2,3,4,5,6-pentafluorophenyl)indenyl])zirconium dichloride;

bis[2-(1-naphthyl)indenyl]zirconium dichloride;

bis(2-(2-naphthyl)indenyl])zirconium dichloride;

bis(2-[(4-phenyl )phenyl]indenyl])zirconium dichloride;

bis[2-[(3-phenyl)phenyl]indenyl]zirconium dichloride;

(pentamethylcyclopentadienyl)(1-methyl-2-phenylindenyl)zirconium dichloride;

(pentamethylcyclopentadienyl)(2-phenylindenyl) zirconium dichloride;

(pentamethylcyclopentadienyl)(1-methyl-2-phenylindenyl)zirconium dimethyl;

(pentamethylcyclopentadienyl)(2-phenylindenyl) zirconium dimethyl;

(cyclopentadienyl)(1-methyl-2-phenylindenyl)zirconium dichloride;

(cyclopentadienyl)(2-phenylindenyl)zirconium dichloride;

(cyclopentadienyl)(1-methyl-2-phenylindenyl)zirconium dimethyl;
(cyclopentadienyl)(2-phenylindenyl)zirconium dimethyl;
and the corresponding hafnium compounds such as:
bis(2-phenylindenyl)hafnium dichloride;
bis(2-phenylindenyl)hafnium dimethyl;
bis(1-methyl-2-phenylindenyl)hafnium dichloride;
bis(1-methyl-2-phenylindenyl)hafnium dimethyl;
bis [2-(3,5-dimethylphenyl)indenyl]hafnium dichloride;
bis[2-(3,5-bis-trifluoromethyphenyl)indenyl]hafnium dichloride;
bis[2-(3,5-bis-tertbutylphenyl)indenyl]hafnium dichloride;
bis[2-(3,5-bis-trimethylsilylphenyl)indenyl]hafnium dichloride;
bis[2,(4-fluorophenyl)indenyl]hafnium dichloride;
bis[2-(2,3,4,5-tetrafluorophenyl)indenyl]hafnium dichloride;
bis [2-(2,3,4,5,6-pentafluorophenyl)indenyl]hafnium dichloride;
bis[2-(1-naphthyl)indenyl]hafnium dichloride;
bis[2-(2-naphthyl)indenyl]hafnium dichloride;
bis(2-((4-phenyl)phenyl)indenyl])hafnium dichloride;
bis[2-[(3-phenyl)phenyl]indenyl]hafnium dichloride;
(pentamethylcyclopentadienyl)(1-methyl-2-phenylindenyl)hafnium dichloride;
(pentamethylcyclopentadienyl)(2-phenylindenyl)hafnium dichloride;
(pentamethylcyclopentadienyl)(1-methyl-2-phenylindenyl)hafnium dimethyl;
(pentamethylcyclopentadienyl)(2-phenylindenyl)hafnium dimethyl;
(cyclopentadienyl)(1-methyl-2-phenylindenyl)hafnium dichloride;
(cyclopentadienyl)(2-phenyl indenyl)hafnium dichloride;
(cyclopentadienyl)(1-methyl-2-phenylindenyl)hafnium dimethyl;
(cyclopentadienyl)(2-phenylindenyl)hafnium dimethyl;
and the like.

Other metallocene catalyst components of the catalyst system according to the present invention include:
bis(3,4-dimethyl-1-phenyl-cyclopentadienyl)zirconium dichloride;
bis(3,4-dimethyl-1-p-tolyl-cyclopentadienyl)zirconium dichloride;
bis (3,4-dimethyl-1-(3,5 bis(trifluoromethyl)phenyl)-cyclopentadienyl)zirconium dichloride;
bis(3,4-dimethyl-1-(4-tert-butylphenyl)-cyclopentadienyl)zirconium dichloride;
and the corresponding hafnium compounds, such as:
bis(3,4-dimethyl-1-phenyl-cyclopentadienyl)hafnium dichloride;
bis(3,4-dimethyl-1-p-tolyl-cyclopentadienyl)hafnium dichloride;
bis(3,4-dimethyl-1-(3,5 bis(trifluoromethyl)phenyl)-cyclopentadienyl)hafnium dichloride;
bis(3,4-dimethyl-1-(4-tert-butylphenyl)-cyclopentadienyl)hafnium dichloride;
and the like.

It should be understood that other unbridged rotating, non-rigid, fluxional metallocenes may be employed in the methods of this intention, including those disclosed in our above-identified Provisional applications, which are hereby incorporated by reference to extent needed for support.

The Examples disclose a method for preparing the metallocenes in high yield. Generally, the preparation of the metallocenes consist of forming the indenyl ligand followed by metallation with the metal tetrahalide to form the complex.

Appropriate cocatalysts include alkylaluminum compounds, methylaluminoxane, or modified methylaluminoxanes of the type described in the following references: U.S. Pat. No. 4,542,199 to Kaminsky, et al.; Ewen. J. Am. Chem. Soc., 106 (1984), p. 6355; Ewen, et al., J. Am. Chem. Soc. 109 (1987) p. 6544, Ewen. et al., J. Am. Chem. Soc. 110 (1988), p. 6255; Kaminsky, et al, Angew. Chem., Int. Ed. Eng. 24 (1985), p. 507. Other cocatalysts which may be used include Lewis or protic acids, such as $B(C_6F_5)_3$ or $[PhNMe_2H]^+B(C_6F_5)^-_4$, which generate cationic metallocenes with compatible non-coordinating anions in the presence or absence of alkyl-aluminum compounds. Catalyst systems employing a cationic Group 4 metallocene and compatible non-coordinating anions are described in European Patent Applications 277,003 and 277,004 filed on Jan. 27, 1988 by Turner, et al.; European Patent Application 427,697-A2 filed on Oct. 9, 1990 by Ewen, et al.; Marks, et al., J. Am. Chem. Soc., 113 (1991), p. 3623; Chien, et al., J. Am. Chem. Soc., 113 (1991), p. 8570; Bochmann et al., Angew. Chem. Intl. Ed. Engl. 7 (1990), p. 780; and Teuben et al., Organometallics, 11 (1992), p. 362, and references therein.

The catalysts of the present invention consist of un-bridged, non-rigid, fluxional metallocenes which can change their geometry on a time scale that is between that of a single monomer insertion and the average time of growth of a polymer chain. This is provided by a non-rigid metallocene catalyst comprising cyclopentadienyl and/or substituted cyclopentadienyl ligands substituted in such a way that they can alternate in structure between states which have different coordination geometries. This is achieved in the present invention by using unbridged cyclopentadienyl ligands.

In one of many embodiments, these catalyst systems can be placed on a suitable support such as silica, alumina, or other metal oxides, $MgCl_2$ or other supports. These catalysts can be used in the solution phase, in slurry phase, in the gas phase, or in bulk monomer. Both batch and continuous polymerizations can be carried out. Appropriate solvents for solution polymerization include liquified monomer, and aliphatic or aromatic solvents such as toluene, benzene, hexane, heptane, diethyl ether, as well as halogenated aliphatic or aromatic solvents such as $CH_2Cl_2$, chlorobenzene, fluorobenzene, hexaflourobenzene or other suitable solvents. Various agents can be added to control the molecular weight, including hydrogen, silanes and metal alkyls such as diethylzinc.

The metallocenes of the present invention, in the presence of appropriate cocatalysts, are useful for the homo-polymerization (and co-polymerization) of alpha-olefins, such as propylene, 1-butene, 1-pentene, 4-methyl-1-pentene, 1-hexene, 1-octene, and combinations thereof, and of copolymerization with ethylene. The polymerization of olefins is carried out by contacting the olefin(s) with the catalyst systems comprising the transition metal component and in the presence of an appropriate cocatalyst, such as an aluminoxane, or a Lewis acid such as $B(C_6F_5)_3$. In co-monomer systems, and in particular ethylene-propylene monomer systems, productivities in excess of 41 kg/g for the copolymerizations has been attained [see Example 85]

The metallocene catalyst systems of the present invention are particularly useful for the polymerization of propylene monomers and the propylene-ethylene monomer mixtures to produce polypropylenes and propylene-ethylene co-polymers with novel elastomeric properties. By elastomeric, we mean a material which tends to regain its shape upon extension, such as one which exhibits a positive power of recovery at 100%, 200% and 300% elongation. The properties of elastomers are characterized by several variables. The tensile set (TS) is the elongation remaining in a polymer sample after it is stretched to an arbitary elongation (e.g. 100% or 300%) and allowed to recover. Lower set indicates higher elongational recovery. Stress relaxation is measured as the decrease in stress (or force) during a time period (e.g. 30 sec. or 5 min.) that the specimen is held at extension. There are various methods for reporting hysteresis during repeated extensions. In the present application, retained force is measured as the ratio of stress at 50% elongation during the second cycle recovery to the initial stress at 100% elongation during the same cycle. Higher values of retained force and lower values of stress relaxation indicate stronger recovery force. Better general elastomeric recovery properties are indicated by low set, high retained force and low stress relaxation.

It is believed that the elastomeric properties of the polypropylenes and propylene-ethylene copolymers of this invention are due to an alternating block structure comprising of isotactic and atactic stereo-sequences. Without being bound by theory, it is believed that isotactic block stercosequences tightly interlocked with one another provide crystalline blocks which can act as physical crosslinks in the polymer network. These crystalline blocks are separated from one another by intermediate, atactic lengths of the polymer which enable the polymer to elastically deform. While we do not wish to be bound by theory it is believed the ethylene is incorporated randomly between the propylene units in the chain.

The structure of the polymers may be described in terms of the isotactic pentad content [mmmm] which is the percentage of isotactic stereosequences of 5 contiguous stereocenters, as determined by $^{13}C$ NMR spectroscopy (Zambelli, A., et al. "Model Compounds and $^{13}C$ NMR Observation of Stereosequences of Polypropylene" Macromolecules 1975, 8, 687–689). The isotactic pentad content of statistically atactic polypropylene is approximately 6.25%, while that of highly isotactic poly-propylene can approach 100%. For co-polymers the isotactic pentad content may be defined as the ratio of the area of PmPmPmPmPm+PmPmPmPmPE peaks over the area of all methyl peaks.

While it is possible to produce propylene homopolymers and copolymers with ethylene having a range of isotactic pentad contents, the elastomeric properties of the polymer will depend on the distribution of isotactic (crystalline) and atactic (amorphous) stereosequences, as well as the distribution of comonomer in the copolymer. Semicrystalline thermoplastic elastomers of the present class of materials consist of amorphous-crystalline block polymers, and thus the blockiness of the polymer determines whether it will be elastomeric. Crystallizable isotactic block length and content must be sufficient to provide a crosslinked network with usefully high Tm, but below the crystallinity of a hard plastic.

We have discovered that the structure, and therefore the properties of the alpha olefin polymers obtained with the catalysts of the present invention are dependent on olefin concentration, the ratio of olefins in the feed, the nature of the ligands, reactant pressure, the temperature of the polymerization, the nature of the transition metal, the ligands on the metallocene, the nature of the cocatalyst, and the reaction system.

It will be appreciated from the illustrative examples that the catalyst systems of this invention provide a broad range of polymer properties from the polymerization process of this invention. Polymers which range in properties from non-elastomeric thermoplastics to thermoplastic elastomers can be readily obtained by suitable manipulation of the metallocene catalyst, the reaction conditions, or the cocatalyst to give all by proper choice of process conditions and catalyst.

Without being bound by theory, it is believed that it is critical for the present invention to have a catalyst which can isomerize between states on a time scale that is slower than the rate of olefin insertion but faster than the average time to construct a single polymer chain in order to obtain a block structure. In addition, to produce elastomeric polymers, the catalyst complex isomerizes between states which have different coordination geometries. This is provided in the present invention by metallocene catalysts comprising of unbridged cyclopentadienyl-based ligands which are substituted in such a way that they can exist in different geometric states during the course of the polymerization reaction.

Based on the evidence to date, it appears that the rotation of the cyclopentadienyl ligands provides a mechanism for the alternation of catalyst geometry between the two states. The average block size distribution for a polymer produced with a catalyst which can change its state is controlled by the relative rate of polymerization versus catalyst isomerization as well as the steady-state equilibrium constant for the various coordination geometries (e.g. chiral vs. achiral). The catalysts of this invention provide a means of producing polypropylenes and other alpha olefins with a wide range of isotactic and atactic block lengths by changing the substituents on the cyclopentadienyl ligands of the metallocene. It is believed that modification of the cyclopentadienyl ligands and/or the nature of the transition metal will alter one or more of the following: The rate of polymerization, the rate of catalyst isomerization, and the steady-state equilibrium constant between the various coordination geometries, all of which will affect the block lengths and block length distribution in the resulting polymer. For example, it is believed that introduction of larger substituents on the cyclopentadienyl ligands will slow the rate of rotation and thereby increase the block lengths in the polymer. Of particular interest is the ability to produce high melting thermoplastic elastomers from catalysts which normally produce only non-elastomeric thermoplastics by the incorporation of small amounts of a second olefin. The comonomer is believed to insert randomly into the isotactic and atactic blocks, thereby disrupting crystallinity, but still providing a thermoplastic elastomer network (i.e. alternating stereoblock structure) with sufficient isotactic block lengths to achieve high melting polymers.

As described in U.S. Pat. No. 5,594,080, the disclosure of which is incorporated by reference herein, fluxional catalysts of the type described herein are useful for the production of elastomeric polyolefins. The productivity of catalyst systems has a large influence on their commercial viability; we have found that addition of small amounts of ethylene to a reaction system useful for the preparation of polyolefin elastomers has a quite unexpected and beneficial effect of increasing the productivity of the reaction system dramatically. It is known that most polymerization catalysts are more active for ethylene polymerization than alpha olefin polymerization, thus a somewhat higher productivity might be expected for a polymerization system containing both ethylene and an alpha olefin. However, the disproportionately large and unexpected increase in productivity of the catalysts systems of the present invention in the presence of as little as 0.6 weight percent ethylene in the reaction system is not predictable from prior works, and is evidence for the non-linear increase in productivity which we term the "Polymerization Rate-Enhancement effect" (PRE effect), which is quantifiable in terms of an "Ethylene Enhancement Factor" or EEF. The ethylene enhancement factor EEF can be calculated from the well-known equations which describe the copolymerization of olefins. By way of illustration, we derive these equations for the effect of ethylene on propylene polymerization, but the Polymerization Rate-Enhancement effect will apply in the case of other alpha olefins as well.

The rate of olefin polymerization in the presence of two monomers such as ethylene and propylene can be described by 1st order Markov model given by the following four equations:

$$M_e + E \xrightarrow{k_{ee}} M_e \qquad \text{Eq. (1)}$$

$$M_e + P \xrightarrow{k_{ep}} M_p \qquad \text{Eq. (2)}$$

$$M_p + P \xrightarrow{k_{pp}} M_p \qquad \text{Eq. (3)}$$

$$M_p + E \xrightarrow{k_{pe}} M_e \qquad \text{Eq. (4)}$$

where $M_e$ and $M_p$ are the active centers with the last ethylene and propylene inserted units, respectively and $k_{ee}$ is the rate constant for ethylene insertion at an ethylene site $M_e$, and $k_{ep}$ is the rate constant of propylene insertion at an ethylene site $M_e$, etc. . . . The rate of polymerization in the presence of both ethylene and propylene, $R_{ep}$, can be expressed as:

$$R_{ep}=k_{ee}[M_e][E]+k_{pe}[M_p][E]+k_{ep}[M_e][P]+k_{pp}[M_p][P]$$

Since, under steady-state conditions, the rates of interconversion of $M_e$ into $M_p$ and of $M_p$ into $M_e$ are equal:

$$k_{pe}[M_p][E]=k_{ep}[M_e][P]$$

and we can express $[M_e]$ through $[M_p]$ as:

$$R_{ep}=k_{ee}(k_{pe}/k_{ep})[M_p][E][E]/[P]+2k_{pe}[M_p][E]+k_{pp}[M_p][P].$$

At low ethylene concentrations in the feed, where $[P]=[P^h]$, the ratio of the rate of polymerization in the presence of both monomers, $R_{ep}$, to the rate of propylene polymerization. $R_{pp}$, is:

where $k_{pp}{}^h$, $M_p{}^h$, $P^h$ signify the values for propylene polymerization in the absence of ethylene, and $k_{ee}/k_{ep}=r_e$ and $k_{pp}/k_{pe}=r_p$.

The ratio of the rates of polymerization in the presence and absence of ethylene are related to the ratio of the corresponding productivities, $P_{ep}$ and $P_{pp}$:

$$\frac{Rep}{Rpp} = \frac{Pep}{Ppp} = \frac{kpp[Mp]}{kpp^h[M_p^h]}(re[E]^2/rp[P]^2 + 2[E]/(rp[P])-1). \qquad \text{Eq. (5)}$$

In equation 5 the increase of polymerization productivity due to the faster rate of ethylene insertion is described by expression $(r_e[E]^2/r_p[P]^2+2[E](r_p[P])+1)$. The expression $k_{pp}[M_p]/k_{pp}{}^h[M_p{}^h]$ is the Ethylene Enhancement Factor (EEF) and describes the ratio of the rate of consecutive propylene-propylene insertions in the presence of ethylene as compared to the rate in the absence of ethylene:

$$EEF = \qquad \text{Eq. (6)}$$
$$\frac{kpp[Mp]}{kpp^h[M_p^h]} = \frac{Pep}{Ppp}(re[E]^2/rp[P]^2 + 2[E]/(rp[P])+1)^{-1}.$$

If there is no ethylene enhancement effect, then the EEF should be equal to unity, that is EEF=$k_{pp}[M_p]/(k_{pp}{}^h[M_p{}^h])$=1. An EEF greater than one is a metric that signifies an unexpected and non-linear increase in productivity in the presence of ethylene that cannot be anticipated due to the greater rate of ethylene insertion relative to that of alpha olefins.

For the catalysts of the present invention, we find dramatic and non-linear increases in productivities of alpha olefins in the presence of minor amounts of ethylene. Catalyst systems containing as little as 0.6% by weight of ethylene in the feed result in more than a two-fold increase in productivity (EEF=2.2) to give elastomeric polyolefins. In another example, as little as 5 wt. % ethylene in the feed results a 10-fold increase in productivity to Pi%e useful elastomeric products. Thus, one of the benefits of the Polymerization Rate-Enhancement effect (PRE effect) of this invention is that catalyst systems which in the absence of ethylene might be of marginal or little commercial interest are useful for the production of elastomeric polymers.

By using the novel metallocene catalyst systems of the invention without ethylene, we obtain polymers which range in properties from non-elastomeric thermoplastics to useful elastomeric α-olefin polymers. By use of ethylene as described herein to take advantage of the Polymerization Rate-Enhancement effect, elastomeric α-olefin polymers may be obtained, but at rates up to ten fold greater than the use of the same catalyst systems without the ethylene.

Furthermore, by use of the novel metallocene catalysts of the present invention we obtain alpha olefin (preferably propylene) elastomers by adding ethylene to an unbridged fluxional metallocene polymerization system which may not otherwise produce useful elastomeric homopolymers. By use of certain metallocene catalysts of the present invention, a remarkable improvement in the properties of propylene homopolymers can be realized by incorporation of small amounts of ethylene (10% or less). For example, polymerization of propylene with certain catalysts of the present invention can yield non-elastomeric propylene homopolymers with tensile sets above 39%, stress relaxation above 60% and no retained force. Incorporation of small amounts (10% or less) of ethylene into these polymerization system surprisingly results in polymers with good elastomeric properties. This is an example of the Elastomeric Property-Enhancement (EPE) effect.

The polymers of the present invention have useful elastomeric properties. These are a consequence the degree of crystallinity in the polymers which is controlled by the use of the catalysts and ethylene enhancement processes of this invention. The degree of crystallinity of the polymers of this invention are typically in the range of 1–40%, preferably in the range of 5–30% and most preferably in the range of 10–25%. The melting points of the polymers of the present invention are typically above 80° C., preferably above 100° C., including those in the range of 120° C. to 140° C. and above. The elastomeric polymers of the present invention exhibit tensile moduli in the range of 2–30 MPa, with values preferably below 20 MPa and most preferably below 15 MPa. The elastomeric polymers of the invention exhibit a positive force of recovery upon elongation. Typically, the retained force at 50% extension following 100% elongation is in the range of 10–50%, preferably in the range of 15–50%, and most preferably in the range 20–50%. The recovery properties of the polymers are also very good as evidenced by tensile set at 100% elongations of typically less than 50%, preferably less than 20% and most preferably less than 10%.

DETAILED DESCRIPTION OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

I. Metallocene Catalyst Preparation

EXAMPLE 1

Preparation of 2-Phenylindene, (Ligand 1)

A solution of 2-indanone (13.47 g, 102 mmol) in anhydrous benzene (100 mL) was added to phenylmagnesium bromide (3.0 M in diethyl ether, 50.9 mL. 153 mmol) at 5° C. over 2.5 hours. The reaction was allowed to warm to room temperature over 30 minutes. The solution was cooled to 0° C. and 150 mL of water are added. The resultant mixture was diluted with 200 mL of hexanes, neutralized with 5 M HCl, and washed with brine (2×100 mL). The aqueous layer was extracted with hexanes (2×50 mL), and the combined organic layers were dried ($MgSO_4$), filtered, and the solvent removed in vacuo from the filtrate to yield a brown oil. This oil and p-toluenesulfonic acid (0.50 g) were dissolved in benzene (250 mL) in a round-bottom flask below a Soxhlet extractor containing 4 Å molecular sieves. After refluxing for 2.5 hours, the solution was filtered and cooled to 5° C. overnight. The product, a white flaky solid, was collected by filtration, and was washed with 50 mL of cold benzene. Additional product is obtained by concentrating the filtrate, cooling, and filtering the crystals (12.60 g, 64.3% yield). $^1$H NMR (400 MHz, 20 C, $CDCl_3$) 7.62 (d, J=7.3 Hz, 2H), 7.47 (d, J=7.3 Hz, 1H), 7.39 (M, 3H), 7.27 (m, 2H), 7.22 (s, 1H), 7.18(t, J=7.4 Hz, 1H), 3.78(S<2H), $^{13}C\{^1H\}$ NMR (100 MHz, 20 C, $CDCl_3$): 146.3, 145.3, 143.1, 135.9, 128.6, 127.5, 126.5, 126.4, 125.6, 124.7, 123.6, 120.9, 38.9.

EXAMPLE 2

Preparation of Bis(2-phenylindenyl)zirconium dichloride, Catalyst A (Ligand 1)

A solution of n-butyllithium (1.6 M in hexanes, 3.25 mL, 5.2 mmol) was added to a solution of 2-phenylindene (1.01 g, 5.3 mmol) in tetrahydrofuran (40 mL) at −78° C. over 2 minutes. The orange solution was warmed to room temperature over 30 minutes. After solvent is removed in vacuo, the yellow solid was suspended in toluene (25 mL). To this mixture was added a suspension of $ZrCl_4$ (612 mg, 2.6 mmol) in toluene (25 mL) at room temperature. This yellow solution was stirred for 2.5 h, heated to 80 C, and filtered over a medium frit packed with Celite. The Solution was cooled to −20 C overnight, resulting in the formation of yellow-orange rod-like crystals of bis (2-phenylindenyl) zirconium dichloride (1.173 g, 82.0% yield). $^1$H NMR (400 MHz, 20 C, $C_6D_6$): δ 7.38 (d, J=7.1 Hz, 4H), 7.17 (m, 4H), 7.10 (m, 2H), 7.04 (dd, J=6.5, 3.1 Hz, 4H), 6.90 (dd, J=6.5, 3.1 Hz, 4H), 6.41 (s, 4H). $^{13}C\{^1H\}$ NMR (100 MHz, 20 C, $C_6D_6$) δ 133.6, 132.7, 128.9, 128.5, 127.2, 126.9, 126.7, 125.1, 103.6.

EXAMPLE 3

Preparation of Bis(2-phenylindenyl)zirconium dimethyl, Catalyst B (Ligand 1)

A solution of methyllithium (1.4 in diethyl ether, 0.75 mL, 1.05 mmol) was added to a solution of bis(2-phenyl-indenyl) zirconium dichloride (280 mg, 0.51 mmol) in diethyl ether (100 mL) at −100° C. The bright yellow solution is warmed to room temperature over 30 minutes. After 3 hours, volatiles were removed from the colorless solution and toluene was added (25 mL). The solution was filtered over a medium frit packed with Celite, and solvent is removed in vacuo Crystallization from toluene (1 mL) and pentane (15 mL) yields cream colored cubes (110 mg, 42.5%). $^1$H (400 MHz, 20 C, $C_6D_6$): δ 7.28 (m, 4H), 7.16 (m, 6H), 702 (dd, J=6.4, 3.2 Hz, 4H), 6.93 (dd, J=6.5, 3.2 Hz, 4H), 6.00 (s, 4H), −0.85 (s, 6H).

EXAMPLE 4

Preparation of Bis(2-phenylindenyl)hafnium dichloride, Catalyst C (Ligand 1)

A solution of n-butyllithium (2.5 M in hexanes, 2.45 mL, 61 mmol) was added to a solution of 2-phenylindene (1.18 g, 61 mmol) in tetrahydrofuran (40 mL) at −78° C. over 2 minutes. The orange solution was warmed to room temperature over 30 minutes. After solvent was removed in vacuo, the orange oil was suspended in toluene (65 mL). To this mixture was added a suspension of $HfCl_4$, (99.99% Hf, 980 mg, 3.1 mmol) in toluene (5 mL) at room temperature. This rust colored solution was stirred in the dark for 3 hours and filtered over a medium frit packed with Celite. Solvent is removed to yield a dark orange solid. A 100 mg sample was freed from unreacted ligand by sublimation at 120 C. Recrystallization from toluene at −20° C. overnight yields a dark yellow solid (28 mg, 28% yield). $^1$H NMR (400 MHz 20° C. $C_6D_6$): δ 7.36 (d, J=7.2 Hz, 4H), 7.18 (m, 4H), 7.12 (m, 2H), 7.07 (dd, J=6.6, 3.1 Hz, 4H) 6.88 (dd, J=6.6, 3.1 Hz, 4H), 6.29 (s, 4H), $^{13}C\{^1H\}$ NMR (100 MHz) 20° C., $C_6D_6$): δ132.7, 132.1, 128.8, 128.5, 127.2, 126.1, 125.1, 101.4.

EXAMPLE 5

Preparation of 2-(Bis-3,5-trifluoromethylphenyl) indene, Ligand 2

A 3-neck 500 mL round-bottomed flask fitted with a condenser and an addition funnel was charged with 2.62 g (0.11 mol) of Mg turnings and 20 mL of anhydrous diethyl ether. Slow addition of a solution of 25.10 g (0.09 mol) of 3,5-bis(trifluoromethyl) bromobenzene in diethyl ether (100 mL), followed by refluxing for 30 min, gave a brown-grey solution of the aryl Grignard reagent. The solution was cooled to room temperature, filtered over a plug of Celite and evacuated to yield a brown oil. Toluene (40 mL) was added and the suspension cooled to 0° C. whereupon a solution of 2-indanone (9.22 g, 0.07 mol) in toluene (60 mL) was added dropwise to give a tan-brown slurry. This mixture was warmed to room temperature and stirred for an additional 3 hours. After cooling to a 0° C. it was quenched with 150 mL of water. Hexane (200 mL) was added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed under vacuo yielding 21.5 g (89% based on 2-indanone) of 2-(bis-3,5-(trifluoromethyl) phenyl)indanol as an off-white solid. $^1$H NMR (DCDl$_3$, 23 C, 400 MHz): δ 8.05 (s, 2H), 7.80 (s, 1H), 7.5–7.0 (M, 4H), 3.41 (m, 4H), 2.21 (s, 1H, OH). Under argon, this alcohol (21.5 g, 0.06 mol) and p-toluene-sulfonic acid monohydrate (800 mg) were dissolved in toluene (250 mL) and the solution was heated to reflux for 6 hours to afford 14.4 g, (70%) of 2-(bis-3,5(trifluoromethyl)-phenyl)indene upon recrystallization from diethyl ether/hexane at −18 C. $^1$H NMR (CDCl$_3$, 23° C., 400 MHz): δ 8.01 (s, 2H, Ar$_f$), 7.75 (s, 1H, Ar$_f$), 7.52 (d, J=7 Hz, 1H), 7.47 (d, J=7 Hz, 1H), 7.43 (s, 1H), 7.33 (dd, 2J=7 Hz, 1H), 7.27 (dd, 2J=7 Hz, 1H), 2.83 (s, 2H), $^{13}$C NMR (CDCl3, 23 C, 100 MHz): δ 144.3 (s), 143.1 (s), 138.0 (s), 132.1 (q, $^2J_{C-F}$=33 Hz), 130.1 (d, $J_{C-H}$=167 Hz), 127.0 (dd), $J_{C-H}$=160 Hz, $^2J_{C-H}$=7 Hz), 126.0 (dd, $J_{C-H}$=159 Hz, $^2J_{C-H}$=7 Hz)m 125.2 (brd, $J_{C-H}$=162 Hz), 123.9 (dd, $J_{C-H}$=156 Hz, $^2J_{C-H}$=9 Hz), 123.4 (q, $J_{C-F}$=273 Hz, CF$_3$), 121.8 (dd, $J_{c-H}$=160 Hz, $^2J_{C-H}$=8 Hz), 120.6 (brd, $J_{C-H}$=167 Hz), 38.9 (td, $J_{C-H}$=127 Hz, $^2J_{C-H}$=7 Hz, CH$_2$). C, H analysis: Anal. Found (Calcd): C, 62.45(62–20); H 3.01 (3.07).

EXAMPLE 6

Preparation of Bis(2-(Bis-3,5-trifluoromethyl) phenyl)indenyl)zirconium dichloride, Catalyst D (Ligand 2)

N-Butyllithium (2.5 M in hexanes, 850 mL, 2.13 mmol) was added to a solution of 2-(bis-3,5(trifluoromethyl) phenyl)indene (648 mg, 1.97 mmol) in toluene (15 mL). The heterogeneous solution was stirred at ambient temperature for 4 hours 30 minutes to give a green-yellow solution which was treated with a suspension of ZrCl$_4$ (240 mg, 1.03 mmol) in toluene (20 mL) via cannula. The yellow suspension was stirred at ambient temperature for 2 hours 30 minutes, heated to ca. 80 C, and filtered over a plug of Celite. After washing the Celite with hot toluene several times (3×10 mL), the filtrate was concentrated and cooled to 18 C to give 442 mg (55%) of light yellow crystals of Bis(2-(Bis-3,5-trifluoromethylphenyl)-indenyl)zirconium dichloride, catalyst D. $^1$H NMR (C$_6$D$_6$, 23 C, 400 MHz): δ 7.67 (s, 2H, ar$_f$), 7.55 (s, 4H, Arf), 7.19 (m, 4H, Ar), 6.89 (m, 4H, Ar), 5.96 (s, 4H, Cp-H). 13C NMR (C$_6$D$_6$, 23 C, 100 MHz: δ 135.6 (s), 133.1 (s), 131.6 (q, $^2J_{C-F}$=33 Hz), 127.1 (brd, $J_{C-H}$=161 Hz), 126.8 (s), 126.4 (dd, $J_{C-H}$=161 Hz, $^2J_{C-H}$=8 Hz), 125.4 (dd, $J_{C-H}$=167 Hz), $^2J_{C-H}$=5 Hz), 123.8 (q, $J_{C-F}$=273 Hz, C$_{-F}$), 121. 8 (brd, $J_{C-H}$=159 Hz), 102.5 (dd, $J_{C-H}$=176 Hz, $^2J_{C-H}$=7 Hz, Cp (C—H). C, H analysis: Anal. found (Calcd.): C, 49.99 (50.01): H, 2.32 (2.22).

EXAMPLE 7

Preparation of Bis(2-(Bis-3,5-trifluoromethyl-phenyl)indenyl)hafnium dichloride, Catalyst E (Ligand 2)

N-Butyllithium (1.6M in hexanes, 2 mL, 3.20 mmol) was added dropwise at ambient temperature to a solution of 2-(bis-3,5(trifluoromethyl)phenyl)indene (1.03 g, 3.14 mmol) in diethyl ether (10 mL). After stirring for 30 min, the solvent was removed in vacuo leaving a green-yellow solid. In a drybox, HfCl$_4$, (510 mg, 1.59 mmol) was added to the lithium salt. The solids were then cooled to −78 C at which temperature toluene (45 mL) was slowly added. The flask was allowed to reach ambient temperature and the suspension was stirred for 24 hours after which time it was heated for 15 min to ca. 80 C (heat gun). The solvent was then removed in vacuo. The solid was extracted with CH$_2$Cl$_2$ (50 mL) and the solution filtered over a plug of Celite. After washing the Celite with 4×15 mL CH$_2$Cl$_2$, the solvent was removed under vacuo from the filtrate. The solid was dissolved in 15 mL of CH$_2$Cl$_2$, filtered and over filtrate a layer of hexane (40 mL) was slowly added. Crystals of Bis(2-(Bis-3,5-trifluoromethylphenyl)indenyl)hafnium dichloride Catalyst E were obtained from this layered solution at −18 C. $^1$H NMR (C$_6$D$_6$, 23° C., 200 MHz); δ 7.65 (s, 2H, AR$_f$), 7.51 (s, 4H, AR$_f$), 6.7–7.3 (m, 8H Ar), 5.63 (s, 4H, Cp-H). $^{13}$C NMR (C6D6 23° C., 100 MHz): δ 135.8 (s), 132.9 (s), 131.6 (q, $^2J_{C-F}$=34 Hz), 127.2 (brd, $J_{C-H}$=160 Hz), 126.3 (dd, $J_{C-H}$=161 Hz, $^2J_{C-H}$=8 Hz), 1.26.0 (s), 125.6 (dd, $J_{C-H}$=167 Hz, $^2J_{C-H}$=5 Hz), 123.8 (q, $J_{C-F}$=273 Hz, CF$_3$), 121.7 (brd, $J_{C-H}$=161 Hz), 100.1 (dd, $J_{C-H}$=176 Hz, $^2J_{C-H}$=6 Hz, Cp C—H). C, H analysis: Anal. Found (Calcd.): C, 45.10 (45–18); H, 1.87 (2.01).

EXAMPLE 8

Preparation of 2-(4-tert-butylphenyl)indene, (Ligand 3)

A 3-neck 250 mL round-bottomed flask fitted with a condenser and an addition funnel was charged with 1.48 g (0.06 mol) of Mg turnings and 10 mL of anhydrous diethyl ether (70 mL), followed by refluxing for 1 hour, gave a yellow solution of the aryl Grignard reagent. The solution was cooled to room temperature, filtered over a plug of Celite, and evacuated to yield a yellow foam. Toluene (15 mL) was added and the suspension cooled to 0° C. and treated dropwise with a solution of 2-indanone (4.97 g, 0.04 mol) in toluene (35 mL) to give an off-white slurry. The heterogeneous reaction mixture was warmed to room temperature and stirred for an additional 30 minutes. After cooling to 0° C. it was quenched with 74 mL of water. Hexane (75 mL) was added and the reaction mixture was neutralized with 5M HCl. The organic layer was separated, and the aqueous layer was extracted with two 15-mL portions of hexane. The combined organic layers were washed with two 30-mL portions of brine and dried over anhydrous magnesium sulfate. After filtration over Celite, the solvent was removed under vacuo yielding a yellow oily solid. The solid was triturated with small portions of hexane to give 4.65 g (46% based on 2-indanone) of 2(4-t-butylphenyl) indanol as a white solid. $^1$H NMR (CDCl$_3$, 23° C., 400 MHz): δ 7.6–7.0 (m, 8H), 3.40 (m, 4H), 2.16 (s, 1H, OH), 1.25 (s, 9H, tBu).

Under argon, this alcohol (4.3 g, 0.06 mol) and p-toluenesulfonic acid monohydrate (120 mg) were dissolved in benzene (74 mL) and the solution was heated to reflux for 2 hours 30 minutes to give 2-(4-t-butylphenyl) indene, which was recrystallized from diethyl ether/hexane at −18° C. (2.74 g, 68%). $^1$H NMR (CDCl$_3$, 23° C., 400 MHz): δ 7.59 (d, J=8.5 Hz, 2H), 7.47 (d, J=7 Hz, 1H), 7.42 (d, J=8.5 Hz, 2H), 7.40 (d, J=7 Hz, 1H), 7.28 (dd, 2J=7 Hz, 1H), 7.20 (s, 1H), 7.18 (dd, 2J=7 Hz, 1H), 3.79 (s, 2H) 1.36 (s, 9H, t-Bu). $^{13}$C NMR (CDCl$_3$, 23° C., 100 MHz): δ 150.7 (s), 146.4 (s), 145.6 (s), 143.1 (s), 126.6 (dd, $J_{C-H}$=159 Hz, $^2J_{C-H}$=7 Hz), 125.8 (d, $J_{C-H}$=163 Hz), 125.6 (dd, $J_{C-H}$=157 Hz, $^2J_{C-H}$=7 Hz), 125.4 (dd, $J_{C-H}$=7 Hz), 124.5 (dd, $J_{C-H}$=159 Hz, $^2J_{C-H}$=7 Hz), 123.6 (dd, $J_{C-H}$=158 Hz, $^2J_{C-H}$=8 Hz), 120.8 (dd, $J_{C-H}$=159 Hz, $^2J_{C-H}$=8 Hz), 39.0 (td, $J_{C-H}$=128 Hz, $^2J_{C-H}$=6 Hz, $\underline{C}H_2$), 34.6 (s, $\underline{C}(CH_3)_3$), 31.3 (brq, $J_{C-H}$=126 Hz, $\underline{C}(CH_3)_3$). Anal. found (calcd.): C, 91.40 (91.88); H, 7.98 (8.12).

EXAMPLE 9

Preparation of Bis(2-(4-tert-butylphenyl)indenyl) zirconium dichloride, Catalyst F (Ligand 3)

N-Butyllithium (1–6 M in hexanes, 1.84 mL, 2.88 mmol) was added to a solution of 2-(4-t-butylphenyl)indene (710 mg, 2.86 mmol) in tetrahydrofuran (15 mL) at –78° C. The orange solution was warmed to ambient temperature and stirred for 30 minutes. The solvent was then removed in vacuo to give a yellow solid. The Schlenk flask was cooled to –78° C. and 15 mL of toluene were added. Then, a suspension of $ZrCl_4$ (333 mg, 1.43 mmol) in toluene (15 mL) was added via cannula. The solution was warmed to room temperature and stirred for 1.5 hours to give a black-red solution, which was filtered over a plug of Celite. After washing the Celite with toluene several times (3×10 mL), the filtrate was concentrated and cooled to –18° C. to give 267 mg (28% of Bis(2-(4-tert-butylphenyl)indenyl) zirconium dichloride as orange crystals. $^1H$ NMR ($C_6D_6$, 23° C., 400 MHz): δ AB pattern centered at 7.42 ppm and integrating for 4H, AB pattern centered at 7.42 ppm and integrating for 4H, 6,56 (s, 2H, Cp-H), 1.30 (s, 9H, t-Bu). $^{13}C\{H\}$ NMR ($C_6D_6$, 23° C., 100 MHz): δ 151.7 (s), 132.6 (s), 130.9 (s), 127.2 (s, Ar C—H), 126.8 (s), 126.9 (s), 126.6 (s, Ar C—H), 125.9 (s, Ar C—H), 125.1 (s, Ar C—H), 103,5 (s, Cp $\underline{C}$—H), 34.7 (s, $\underline{C}(CH3)3$).

EXAMPLE 10

Preparation of Bis(2-(4-tert-butylphenyl)indenyl) zirconium dimethyl (Catalyst G)

A solution of methyl lithium (1.4 M in diethyl ether, 315 mL, 0.44 mmol) was added dropwise to a solution of bis(2-(4-tert-butylphenyl)indenyl)zirconium dichloride (0.140 g, 0.21 mmol) in diethyl ether (10 mL) at –78° C. The yellow solution was warmed to ambient temperature. After 20 min, the solution turned colorless and then was stirred for an additional 2 hours after which time the solvent was removed in vacuo. The product was recrystallized from hexane at –18 C. Yield: 79 mg (60%). $^1H$ NMR ($C_6D_6$, 23° C., 400 MHz): δ 7.37 (m, 8H); 6.99 (m, 8H); 6.16 (s, 4H, Cp-H); 1.30 (s, 18H, t-Bu); –0.77 (s, 6H, CH3). $^{13}C$ NMR ($C_6D_6$, 23° C., 100 MHz): δ 151.0 (s); 132.4 (s); 129.3 (s); 126.2 (dd, $J_{C-H}$=157 Hz, $^2J_{C-H}$=6 Hz, aromatic C—H); 125.9 (dd, $J_{C-H}$=156 Hz, $^2J_{C-H}$=6 Hz, aromatic C—H); 125.0 (brd, $J_{C-H}$=160 Hz, aromatic C—H); 124.83 (brd, $J_{C-H}$=160 Hz, aromatic C—H); 124.78 (s); 98.3 (dd, $J_{C-H}$=172 Hz, $J_{C-H}$=6 Hz, Cp C—H); 36.3 (q, $J_{C-H}$=119 Hz, $Zr(CH_3)_2$); 34.7 (s,$C(CH_3)_3$); 31.4 q,$J_{C-H}$=121 Hz,$C(CH_3)_3$).

EXAMPLE 11

Preparation of 2-(4-trifluoromethylphenyl)indene (Ligand 4)

A 3-neck 250-mL round-bottomed flask fitted with a condenser and an addition funnel was charged with 1.36 g (56 mmol) of Mg turnings and 17 mL of anhydrous diethyl ether. Slow addition of a solution of 10.0 g (44 mmol) of 4-trifluoromethylbromobenzene in diethyl ether (85 mL), followed by refluxing for 30 min, gave a red-brown solution of the aryl Grignard reagent (some precipitate was visible). The solution was cooled to room temperature, filtered over a plug of Celite and most of the solvent was removed in vacuo from the filtrate (ca. 15 mL of $Et_2O$ remained). Toluene (25 mL) was added and the solution cooled to 0° C. whereupon a solution of 2-indanone(4.4 g, 33 mmol) in toluene (50 mL) was added dropwise to give an orange slurry. This mixture was warmed to room temperature and stirred for an additional 45 min. After cooling to 0° C., it was quenched with 95 mL of water. Hexane (75 mL) was added, and the reaction mixture neutralized with 5M HCl. The organic layer was separated, and the aqueous layer was extracted with two 20-mL and one 10-mL portions of hexane. The combined organic layers were washed with two 35-mL portions of brine and dried over anhydrous magnesium sulfate. After filtration over Celite, the solvent was removed in vacuo yielding 2-(4-trifluoromethyl) phenylindanol as a solid. $^1H$ NMR ($CDCl_3$, 23° C., 200 MHz): δ 7.5–8 (m, 4H), 7–7.5 (m, 4H), AB pattern centered at 3.43 ppm and integrating for 4H, 2.38 (s, 1H, OH).

Under argon, this alcohol and p-toluenesulfonic acid monohydrate (200 mg) were dissolved in toluene (100 mL) and the solution was heated to reflux for 4 hours to afford 5.59 g (65%) of 2-(4-trifluoromethylphenyl)indene upon recrystallization from diethyl ether at –18 C. $^1H$ NMR ($CDCl_3$, 23° C., 400 MHz ): δ AB pattern centered at 7.68 ppm and integrating for 4H, 7.51 (d, J=7 Hz, 1H), 7.45 (d, J=7 Hz, 1H), 7.35 (s, 1H), 7.32 (dd, 2J=7 Hz, 1H), 7.25 (dd, 2J=7 Hz, 1H), 3.81 (s, 2H). $^{13}C$ NMR ($CDCl_3$, 23° C., 100 MHz): δ 144.8 (s), 144.7 (s), 143.2 (s), 139.3 (s), 128.8 (d, $J_{C-H}$=168 Hz), 126.8 (dd, $J_{C-H}$=168 Hz, $J_{C-H}$=7 Hz), 125.7 (dd, $J_{C-H}$=161 Hz. $J_{C-H}$=7 Hz), 125.6 (d, $J_{C-H}$=ca. 160 Hz), 25.5 (d, $J_{C-H}$=ca. 160 Hz), 124.2 (q, $J_{C-F}$=272 Hz, $CF_3$), 123.8 (dd, $J_{C-H}$=ca. 160 Hz, $J_{C-H}$=9 Hz), 121.5 (dd, $J_{C-H}$=160 Hz, $J_{C-H}$=9 Hz), 38.9 (td, $J_{C-H}$=129 Hz, $^2J_{C-H}$=7 Hz, $\underline{C}H_2$), C, H analysis: Anal. Found (Calcd. ): C, 74.05 (73.84); H, 4.1.5 (4.26).

EXAMPLE 12

Preparation of Bis(2-(4-trifluoromethylphenyl) indenyl)zirconium dichloride, Catalyst H (Ligand 4)

N-Butyllithium (1–6 M in hexanes, 2.5 mL, 4.0 mmol) was added dropwise to a suspension of 2-(4-(trifluoromethyl)phenyl)indene (1.02 g, 3.9 mmol) in diethyl ether (10 mL). The yellow-orange solution was stirred at ambient temperature for 20 min after which time the solvent was removed in vacuo. In a drybox, to the resulting green-white solid was added $ZrCl_4$ (462 mg, 2.0 mmol). The solids were cooled to –78 C and methylene chloride (50 mL) was slowly added. The yellow suspension was warmed to room temperature and kept there overnight. The orange solution was then filtered over a plug of Celite and the Celite was washed with $CH_2Cl_2$ until the washings were colorless (ca. 40 mL). The product was recrystallized from toluene at –18 C. Yield: 471 mg (35%). $^1H$ NMR ($C_6D_6$, 23° C., 400 MHz): δ 7.36 (d, J=8 Hz, 4H); 7.12 (dd, J=6.5 Hz, J=3.1 Hz, 4H); 7.09 (d, J=8 Hz, 4H); 6.86 (dd, J=6.4 Hz, J=3 Hz, 4H); 6.21 (s, 4H, Cp-H). C, H analysis: Anal. Found(Calcd.): C, 56.42 (56.47); H, 3.00 (2.96).

EXAMPLE 13

Preparation of 2-(4-methylphenyl)indene (Ligand 5)

A 3-neck 500-mL round-bottomed flask fitted with a condenser and an addition funnel was charged with 2.66 g (0.11 mol) of Mg turnings and 20 mL of anhydrous diethyl ether. Slow addition of a solution of 15.0 g (0.09 mol) of 4-bromotoluene in diethyl ether (100 mL), followed by refluxing for 30 min, gave an orange solution of the aryl Grignard reagent. The solution was cooled to room temperature, filtered over a plug of Celite and the solvent was removed in vacuo from the filtrate. Toluene (40 mL) was added and the solution cooled to 0° C. whereupon a solution of 2-indanone (9.27 g, 0.07 mol) in toluene (70 mL) was added dropwise to give an orange slurry. This mixture was warmed to room temperature and stirred for an additional 3 hours. After cooling to 0° C., it was quenched with 150 mL of water. Hexane (150 mL) was added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed in vacuo yielding 2-(4-methyl)phenylindanol as a solid.

Under argon, this alcohol and p-toluenesulfonic acid monohydrate (200 mg) were dissolved in benzene (200 mL) and the solution was heated to reflux for 2 hours. After cooling to room temperature, the solvent was removed in vacuo and the product, 2-(4-methylphenyl)indene, was recrystallized from diethyl ether/hexane. Yield: 7.17 g (50%). $^1$H NMR (CDCl$_3$, 23° C., 400 MHz): δ 7.56 (d, J=8 Hz, 2H); 7.49 (d, J=8 Hz, 1H); 7.41 (d, J=7 Hz. 1H); 7.36–7.14 (overlapping signals integrating for 5H); 3.80 (s, 2H, C$\underline{H}_2$); 2.40 (s , 3H, CH$_3$). $^{13}$C{H} NMR (CDCl$_3$, 23° C., 100 MHz): δ 146.5 (s), 145.5 (s), 143.0 (s), 137.4 (s), 133.2 (s), 129.4 (s); 126.6 (s), 125.64 (s), 125.57 (s), 124.5 (s), 123.6 (s), 120.8 (s), 39.0 (s, C$\underline{H}_2$), 21.3(s, CH$_3$). C, H analysis: Anal. Found (Calcd.): C, 93.25 (93.16); H, 7.00 (6.84).

EXAMPLE 14

Preparation of Bis(2-(4-methylphenyl)indenyl) zirconium dichloride, Catalyst I (Ligand 5)

N-Butyllithium (1.6 M in hexanes, 4.2 mL, 6.7 mmol) was added dropwise to a solution of 2-(4-methyl)phenyl) indene (1.323 g, 6.4 mmol) in Et$_2$O (20 mL). The red-orange solution was stirred at ambient temperature for 30 min after which time the solvent was removed in vacuo. In a drybox, to the resulting solid was added ZrCl$_4$ (0.754 g, 3.2 mmol). The solids were cooled to −78° C. and methylene chloride (60 mL) was slowly added. The solution was warmed to room temperature and kept there overnight. The resulting yellow-orange turbid solution was then filtered over a plug of Celite and the Celite was washed with CH$_2$Cl$_2$ until the washings were colorless (ca. 60 mL). The product was recrystallized from CH$_2$Cl$_2$/hexane at −18° C. Yield: 577 mg (31%). $^1$H NMR (C$_6$D$_6$, 23° C., 400 MHz): δ 7.36 (d, J=8 Hz, 4H); 7.11 (m, 4H); 7.02 (d, J=8 Hz, 4H); 6.92 (m, 4H); 6.43 (s, 4H, Cp-H); 2.17 (s, 6H, CH$_3$). C, H analysis (crystallizes with CH$_2$Cl$_2$): Anal. Found (Calcd.): C, 63.21 (63.46); H, 4.41 (4.42).

EXAMPLE 15

Preparation of 2-(3,5-dimethylphenyl)indene (Ligand 6)

A 3-neck 500-mL round-bottomed flask fitted with a condenser and an addition funnel was charged with 1.86 g (77 mmol) of Mg turnings and 15 mL of anhydrous diethyl ether. Slow addition of a solution of 9.9 g (53 mmol) of 3,5-dimethyl-bromobenzene in diethyl ether (60 mL), followed by refluxing for 1 hour, gave an orange solution of the aryl Grignard reagent. The solution was cooled to room temperature, filtered over a plug of Celite and the solvent was removed in vacuo from the filtrate. Toluene (30 mL) was added and the solution cooled to 0° C. whereupon a solution of 2-indanone-(5.67 g, 43 mmol) in toluene (50 mL) was added dropwise to give an orange slurry. This mixture was warmed to room temperature and stirred for an additional 9 hours. After cooling to 0° C., it was quenched with 100 mL of water. Hexane (150 mL) was added and the reaction mixture neutralized with 5M HCl. The organic layer was separated, and the aqueous layer was extracted with two 40-mL portions of hexane. The combined organic layers were washed with two 40-mL portions of brine and dried over anhydrous magnesium sulfate. After filtration over Celite, the solvent was removed in vacuo yielding 2-(3,5-dimethyl)phenylindanol as a very viscous oil.

Under argon, this alcohol and p-toluenesulfonic acid monohydrate (213 mg) were dissolved in benzene (100 mL) and the solution was heated to reflux for 2 hours. After cooling to room temperature, the solvent was removed in vacuo and the product, (3,5-dimethylphenyl)indene, was recovered by sublimation (120° C., high vacuum). Yield: 3,51 g (37%). $^1$H NMR (CDCl$_3$, 23° C., 400 MHz): δ 7.52 (d, J=7 Hz, 1H); 7.44 (d, J=7 Hz, 1H); 7.4–7.1 (overlapping signals integrating for 5H); 6.98 (s, 1H); 3.82 (s, 2H, C$\underline{H}_2$); 2.41 (s, 6H, CH$_3$). $^{13}$C NMR (CDCl$_3$, 23° C., 100 MHz): δ 146.7 (s), 145.5 (s), 143.1 (s), 138.1 (s), 135.8 (s), 129.3 (d, J$_{C-H}$=155 Hz), 126.5 (dd, J$_{C-H}$=159 Hz, J$_{C-H}$=7 Hz), 126.2 (d, J$_{C-H}$=165.Hz), 124.6 (dd, J$_{C-H}$=159 Hz, J$_{C-H}$=7 Hz), 123.6 (d, J$_{C-H}$=155 Hz), 123.5 (d, J$_{C-H}$=156 Hz), 120.8 (dd, J$_{C-H}$=159 Hz, J$_{C-H}$=8 Hz), 39.1 (td, J$_{C-H}$=129 Hz, $^2$J$_{C-H}$=6 Hz, C$\underline{H}_2$), 21.4 (q, J$_{C-H}$=156 Hz, CH$_3$). C, H analysis: Anal. Found (Calcd.): C, 92.88 (92.68); H, 7.32 (7.32).

EXAMPLE 16

Preparation of Bis(2-(3,5-dimethylphenyl)indenyl) zirconium dichloride, Catalyst J, (Ligand 6)

N-Butyllithium (1.6 M in hexanes, 2.8 mL, 4.5 mmol) was added dropwise to a solution of 2-(3,5-dimethyl)phenyl) indene (0.945 g, 4.3 mmol) in diethyl ether (10 mL). The yellow-orange solution was stirred at ambient temperature for 45 min after which time the solvent was removed in vacuo. In a drybox, to the resulting clear yellow solid was added ZrCl$_4$ (0–504 g, 2.2 mmol). The solids were cooled to −78° C. and methylene chloride (50 mL) was slowly added. The yellow suspension was warmed to room temperature and kept there overnight. The resulting brown-orange solution was then filtered over a plug of Celite and the Celite was washed with CH$_2$Cl$_2$ until the washings were colorless (ca. 40 mL). The product was recrystallized from toluene at −18° C. Yield: 642 mg (50%). $^1$H NMR (C$_6$D$_6$, 23° C., 400 MHz): δ 7.22 (s, 4H); 7.19 (m, 4H); 7.00 (m, 4H); 6.85 (s, 2H); 6.50 (s,4H, Cp-H); 2.27 (s, 12H). $^{13}$C NMR (C$_6$D$_6$, 23° C., 100 MHz): δ 138.2 (brs); 133.9 (s); 133.2 (brs); 130.5 (brd, J$_{C-H}$=ca. 157 Hz); 127.0 (brs); 126.7 (dd, J$_{C-H}$=163 Hz, $^2$J$_{C-H}$=8 Hz, aromatic C—H); 125.24 (d, J$_{C-H}$=ca. 163 Hz, aromatic C—H); 125.16 (dt, J$_{C-H}$=162 Hz, $^2$J$_{C-H}$=6Hz, aromatic C—H); 103.9 (dd, J$_{C-H}$=175 Hz, $^2$J$_{C-H}$=7 Hz, Cp C—H); 21.4 (q, J$_{C-H}$=127 Hz, CH$_3$). C, H analysis: 20 Anal. Found (Calcd.): C, 68.13 (67–98); H, 5.65 (5.03).

EXAMPLE 17

1-Methyl-2-phenylindene (Ligand 7)

Butyllithium (2.5 M in hexanes, 3.0 mL, 7.6 mmol was added dropwise to a suspension of 2-phenylindene (1.382 g, 7.2 mmol) in THF (50 mL) at −78 C. Upon addition of n-butyllithium the reaction mixture turned a dark orange color and 2-phenylindene dissolved. When the addition of the reagents was complete the solution was allowed to warm to room temperature and stirred for 30 minutes. CH$_3$I (1.3 mL, 22 mmol) was added to this solution dropwise and the light brown reaction mixture was heated to 40° C. and stirred for 24 hours. After that the solvents were removed in vacuo and the light brown solid was recrystallized from EtOH (25 mL) at room temperature affording white needles (1.075 g, 75% yield). $^1$H NMR (CDCl$_3$, 20° C., 300 MHz): δ 7.52–7.19 (overlapping signals from aromatic protons, 9H), 3.74 (s, 2H), 2.31 (s, 3H). $^{13}$C {$^1$H}NMR (CDCl$_3$, 20° C., 75 MHz): δ 147.49 (C), 142.42(C), 140.31 (C), 137.56(C), 134.70(C), 128.37 (CH), 128.24 (CH), 126.63 (CH), 126.40 (CH), 124.74 (CH), 123.32 (CH), 119.11 (CH), 40.96 (CH$_2$), 11.94 (CH$_3$).

EXAMPLE 18

Rac-bis(1-methyl-2-phenylindenyl)zirconium dichloride (Catalyst K, Ligand 7)

Butyllithium (2.5 Min hexanes, 6.7 mL, 17 mmol) was added dropwise to the solution of 1-methyl-2-phenylindene (3.447 g, 17 mmol) in THF (50 mL) at −78° C. As the deprotonation of the indene occurred the solution changed from colorless to dark yellow. When the addition was complete the solution was slowly warmed to room temperature, stirred for 30 min, and then evaporated to dryness. Toluene (50 mL) was added to the resulting yellow solid. The resulting suspension was combined with ZrCl$_4$ (1.974 g, 8.4 mmol) suspended in toluene (70 mL). The reaction mixture stirred at 40 C for 24 h. The turbid lemon yellow solution was cooled to room temperature and filtered through a frit packed with Celite. The Celite layer was washed with toluene (3×30 mL). The filtrates were evaporated to dryness. The resulting yellow solid (3.536 g, 65% yield) contained rac-bis(1-methyl-2-phenylindenyl) zirconium dichloride (Catalyst K) and meso-rac-bis(1-methyl-2-phenylindenyl)zirconium dichloride (Catalyst M) in 60:40 ratio. Repeated crystallization from THF/pentane (4:1) gave Catalyst K as yellow rods (610 mg, 11%). Spectroscopic data for Catalyst K: $^1$H NMR (20° C., CDCl$_3$, 300 MHz): δ 7.56 (t, J=7.2 Hz, 4H), 7.45 (m, 8H), 7.26 (t, J=7.6 Hz, 2H), 7.05 (t, J=7.6 Hz, 2H), 6.85 (d, J=8.6 Hz, 2H), 6.06 (s, 2H), 2.52 (s, 6H); $^3$C NMR (CDCl$_3$, 20 C, 75 MHz): δ 134.03 (C), 130.68 (C), 129.05 (CH), 128.70 (CH), 128.35 (C), 128.22 (CH), 126.64 (CH), 126.17 (CH), 125.17 (C), 124.74 (CH), 123.67 (CH), 120.91 (C), 98.64 (CH), 12.75 (CH$_3$). Anal. Found (Calcd): C, 67.26 (67.11); H, 4.86 (4.58).

EXAMPLE 19

Meso-bis(1-methyl-2-phenylindenyl)zirconium dichloride (Catalyst L, Ligand 7)

Repeated crystallization of the mixture from Example 19 from CH$_2$Cl$_2$ produced orange cubes of Catalyst M (554 mg, 10%). Spectroscopic data for Catalyst M: $^1$H NMR (20° C., CDCl$_3$, 300 MHz): δ 7.49 (d, J=8.5 Hz, 2H), 7.34 (m, 11H), 7.19 (m, 5H), 6.07 (s, 2H), 2.57 (s, 6H); $^{13}$C NMR (CDCl$_3$, 20 C, 75 MHz): δ 133.61 (C), 133.51 (C), 129.31 (C), 128.12 (CH), 128.24 (CH), 127.85 (CH), 125.90 (CH), 125.43 (CH), 124.39 (CH), 123.88 (C), 123.84 (CH), 119.24 (C), 97.87 (CH), 12.64 (CH$_3$). Anal. Found (Calcd): C, 66.81 (67.11); H, 4.66 (4.58).

EXAMPLE 20

(Pentamethylcyclopentadienyl)(2-phenylindenyl) zirconium dichloride (Catalyst M)

Butyllithium (2.0 M in pentane, 3.9 mL, 7.8 mmol) was added dropwise to a suspension of 2-phenylindene (1.441 g, 7.5 mmol) in THF (30 mL) at −78° C. As the deprotonation of 2-phenylindene occurred all of it dissolved to give dark orange solution of the lithium salt. When the addition of the reagents was complete the solution was gradually warmed to room temperature, stirred for 30 minutes and then evaporated to dryness. The resulting yellow solid was combined with Cp*ZrCl$_3$ (2.500 g, 7.5 mmol) and toluene (40 mL). The mixture was heated to 60° C. and stirred for 36 h. The turbid yellow solution was filtered through a glass frit packed with Celite. The Celite layer was washed with toluene (3×10 mL). The combined filtrates were evaporated to dryness. The solid was dissolved in CH$_2$Cl$_2$ (15 mL) and the resulting solution was carefully layered with pentane (40 mL). The layered solution was placed in a −18° C. freezer and light yellow crystals formed overnight (0.974 g, 25% yield). $^1$H NMR (CDCl$_3$, 20° C., 300 MHz): δ 7.78 (d, J=7.1 Hz, 2H), 7.52 (dd, J=6.4 Hz, J=3.2 Hz, 2H), 7.44 (t, J=7.2 Hz, 2H), 7.35 (t, J=7.3 Hz, 1H), 7.22 (dd, J=6.5 Hz, J=3.1 Hz, 2H), 6.87 (s, 2H), 1.84 (s, 15 H). $^{13}$C {$^1$H}NMR (CDCl$_3$, 20° C., 75 MHz): δ 132.61 (C), 131.84 (C), 128.41 (CH), 128.37 (CH), 128.12 (CH), 127.19 (C), 126.22 (CH), 124.99 (C), 124.32 (CH), 103.64 (CH), 12.34 (CH$_3$). Anal. Found (Calcd): C, 61.27 (61.45): H, 5.31 (5.36).

EXAMPLE 21

(Pentamethylcyclopentadienyl)(1-methyl-2-phenylindenyl)zirconium dichloride (Catalyst N)

Butyllithium (2.5 M in hexanes, 3.8 mL, 9.5 mmol) was added dropwise to the solution of 1-methyl-2-phenylindene (1.860 g, 9.0 mmol) in THF (20 mL) at −78 C. Upon the deprotonation of the indene the solution became dark yellow. When the addition was complete the solution was slowly warmed to room temperature, stirred for 30 min and then evaporated to dryness. The resulting dark yellow solid was combined with Cp*ZrCl$_3$ (3.0 g, 9.0 mmol) and toluene (50 mL). The mixture was heated to 70 C and stirred for 12 h. The resulting turbid yellow solution was cooled to room temperature and filtered through a glass frit packed with Celite. The Celite layer was washed with toluene (5×25 mL). The combined filtrate and washings were concentrated to a volume of 20 mL and a yellow powdery solid precipitated out of solution. The mother liquor was decanted and the product dried in vacuo (1.5 g , 38%). Yellow rod-like crystals suitable for X-ray analysis were obtained from THF/pentane solution at −18 C. $^1$H NMR (CDCl$_3$, 20° C., 300 MHz): δ 7.50 (t, J=6.84, 2H), 7.33 (m, 6H), 7.04 (t, J=7.6 Hz, 1H), 6.46 (s, 1H), 2.54 (s, 3H), 1.79 (s, 15H). $^{13}$C NMR (CDCl$_3$, 20° C., 75 MHz): δ 133.06 (C), 131.49 (C), 130.85 (C), 130.14 (CH), 128.3 (CH), 127.94 (CH), 126.29 (CH), 126.03 (CH), 124.39 (CH+C), 122.82 (C), 122.61 (CH), 121.99 (C), 95.49 (CH), 12.27 (CH$_3$, Cp*), 11.86 (CH$_3$). Anal. Found (Calcd): C, 62.13 (62.13); H, 5.80 (5.61).

EXAMPLE 22

(Pentamethylcyclopentadienyl)(1-methyl-2-phenylindenyl)dimethyl zirconium (Catalyst O)

Methyllithium (1.4 M in diethyl ether, 2.0 mL, 2.8 mmol) was added dropwise to the suspension of Catalyst O (0.692 g, 1.4 mmol) in diethyl ether (20 mL) at −60° C. The reaction vessel was wrapped with aluminum foil and allowed to warm to room temperature. The reaction mixture was stirred for 2 hours during which time its color changed from bright yellow to white. Then mixture was evaporated to dryness and toluene (20 mL) was added to the resulting white solid. The turbid off-white solution was filtered through a glass frit packed with Celite to give a clear solution, which was evaporated to dryness and recrystallized from hexane (25 mL) at −18° C. producing light yellow crystals (0.265 g, 42% yield). $^1$H NMR (CD$_2$Cl$_2$, 20° C., 300 MHz): δ 7.27 (d, J=8.6 Hz, 1H), 7.10 (m, 7H), 6.85 (d, J=7.6 Hz, 1H), 6.65 (t, J=7.1 Hz, 1H), 2.28 (s, 3H), 1.34 (s, 15H), −0.87 (s, 3H), −2.10 (s, 3H). $^{13}$C NMR (CD$_2$Cl$_2$, 20° C., 75 MHz): δ 135.17 (C), 131.23 (C), 129.72 (CH), 128.49 (CH), 128.15 (C), 127.55 (CH), 124.18 (CH), 124.15 (CH), 123.73 (CH), 123.46 (CH), 123.18 (C), 117.92 (C), 112.83 (C), 91.22 (CH), 37.46 (CH$_3$), 11.62 (CH$_3$), 11.50 (CH$_3$, Cp*). Anal. Found (Calcd): C, 73.12 (72.83); H, 7.41 (7.42).

EXAMPLE 23

(Cyclopentadienyl)(2-phenylindenyl)zirconium dichloride (Catalyst P)

Butyllithium (2.5 M in hexane, 4.4 mL, 11 mmol) was added dropwise to a suspension of 2-phenylindene (2.022 g, 11 mmol) in THF (40 mL) at −78° C. The mixture turned orange and became homogeneous. It was gradually warmed to room temperature, stirred for 60 min, and then evaporated to dryness. The resulting orange solid was combined with CpZrCl3 (2.763 g, 11 mmol) and toluene (70 mL). The reaction mixture was stirred at 30 C for 24 hours. The turbid yellow solution was filtered through a glass frit packed with Celite to give a brown solution. The Celite layer was washed with toluene (20 mL). The combined filtrates were evaporated to dryness. An $^1$H NMR spectroscopic analysis showed that the resulting green-yellow solid contained a mixture of Catalyst P and Catalyst A. Repeated crystallization from a concentrated toluene solution at −18° C. produced pure Catalyst P (0.420 mg, 9% yield). $^1$H NMR (20° C., CDCl$_3$, 300 MHz): δ 7.71 (d, J=7.2Hz, 2H), 7.64 (dd, J=6.5 Hz, J=3.0 Hz, 2H); 7.49 (t, J=7.3 Hz, 2H), 7.38 (t, J=7.2 Hz, 1H), 7.30 (dd, J=6.5 Hz, J=3.0 Hz, 2H), 6.92 (s, 2H), 6.10 (s, 5H). $^{13}$C NMR (CDCl$_3$, 20° C., 75 MHz): δ 134.8 (C), 133.3 (C), 129.0 (CH), 128.9 (CH), 127.2 (C), 126.7 (CH), 126.4 (CH), 125.1 (CH), 116.7 (CH), 100.9 (CH). Anal. Found (Calcd): C, 57.16(57.40), H, 3.67(3.85).

EXAMPLE 24

Preparation of Bromo-3,5-di-t-butylbenzene 1,3,5-Tri-t-butylbenzene (150 g, 0.6 mol) was dissolved in carbon tetrachloride (300 mL) in a three-necked flask which had been painted black to avoid light and equipped with an overhead stirrer, thermometer and addition funnel under argon. Iron pellets (36 g, 0.64 mol) were added and the slurry was cooled to 5° C. t-Butylcatechol (1.0 g) was added and a solution of bromine (201.6 g, 1.26 mol) in carbon tetrachloride (75 mL) was added over a one hour period. The slurry was stirred for an additional 4 hours at 5° C. and quenched by pouring into ice water. The layers were separated and the organics washed with 10% sodium hydroxide solution. The solution was then washed with salt brine and dried over magnesium sulfate. The solvent was evaporated and the product was distilled under vacuum twice to give 75 g of product which was then recrystallized from heptane to give 47 g of pure product (29%).

EXAMPLE 25

Preparation of 2-(3,5-di-t-Butylphenyl)indene (Ligand 8)

1-Bromo-3,5-di-t-butylbenzene (47.2 g, 0.175 mol) was dissolved in ether (500 mL) and cooled to −70° C. t-Butyllithium (200 mL of 1.7 M solution in pentane, 0.34 mol) was added at −70° C. over a two hour period. The solution was allowed to warm to room temperature slowly. Magnesium bromide etherate (46.5 g, 0.18 mol) was added and the slurry was stirred for one hour. The mixture was then cooled to 5° C. and 2-bromoindene (34.2 g, 0.18 mol) was added. The mixture was warmed to room temperature and then refluxed for three hours. The solution was cooled to room temperature and the reaction was quenched carefully with water. The layers were separated and the organics washed with salt brine and dried over magnesium sulfate. The solvents were evaporated and the product was distilled twice and recrystallized from hexane to give 37.1 g of product (70%).

EXAMPLE 26

Preparation of Bis(2-(3,5-di-t-butylphenyl)indenyl) zirconium dichloride (Catalyst Q)

2-(3,5-Di-t-butylphenyl)indene (13.8 g, 0.045 mol) and anhydrous diethyl ether (250 mL) were placed in a 1 L three-necked flask under argon. n-Butyllithium (28 mL of a 1.6 M solution in hexanes, 0.045 mol) as added over a thirty minute period at 0° C. The solution was stirred for an additional two hours. Zirconium tetrachloride (5.1 g, 0.022 mol), was added incrementally over a one hour period. The mixture was then stirred overnight. The ethereal solution was chilled to −10° C. and the solids were collected. The solids were taken up in 300 mL of dichloromethane and the residual solids were removed by filtration through celite. The celite was washed with an additional 100 mL of dichloromethane, and the solvents were evaporated to give 11.2 g of product (64%).

EXAMPLE 27

Preparation of Bis(2-(3,5-di-t-butylphenyl)indenyl) hafnium dichloride (Catalyst R)

2-(3,5-Di-t-butylphenyl)indene (23.3 g, 0.077 mol), and anhydrous diethyl ether (250 mL) were placed in a 1 L three-necked flask under argon. n-Butyl lithium (48 mL of a 1.6 M solution in hexanes, 0.077 mol) was added over a thirty minute period at 0° C. The solution was stirred for an additional two hours. Hafnium tetrachloride (12.2 g, 0.038 mol), was added incrementally over a one hour period. The mixture was then stirred overnight. The ethereal solution was chilled to −10° C. and the solids were collected by filtration. The solids were taken up in 300 mL of dichloromethane and the residual solids were removed by filtration through celite. The celite was washed with an additional 100 mL of dichloromethane, and the solvents were evaporated to give 23.5 g of product (72%).

EXAMPLE 28

Preparation of 3,5-Bis(trimethylsilyl)bromobenzene 1,3,5-Tribromobenzene (125 g, 0.4 mol), was dissolved in anhydrous diethylether (1 L), and cooled to −70° C. n-Butyllithium (250 mL, 1.6 M in hexanes, 0.4 mol) was added dropwise over a one-hour period keeping the temperature near −70° C. The solution was stirred for an additional 20 minutes at −70° C. and then warmed to −10 C. over a two-hour period. The solution was then recooled to −70° C. and trimethylchlorosilane (45 g, 0.4 mol) was added over a one hour period. The solution was allowed to stir and warm to room temperature overnight. The solution was cooled to −70° C. and an additional 0.4 mol n-butyl lithium was added over a one-hour period. The resulting slurry was stirred for one hour at −70° C., warmed to −10° C. over a two-hour period and then recooled to −70° C. An additional 0.4 mol of trimethylchlorosilane was added and the slurry was allowed to warm to room temperature overnight. The mixture was quenched with water and the layers were separated. The organic layer was washed twice with sodium bicarbonate solution and with salt brine then dried over magnesium sulfate. The solvents were evaporated under vacuum and the product distilled twice under vacuum to yield 85.2 g (70%) of a colorless liquid. b.p. 100–105° C. @ 0.5 mmHg.

EXAMPLE 29

Preparation of 2-(3,5-Bis(trimethylsilyl)phenyl) indene (Ligand 9)

Magnesium turnings (6.8 g, 0.28 mol) and anhydorus THF (100 mL) were placed in a three-necked flack under argon. A solution of 3,5-bis(trimethylsilyl)bromobenzene (85.2 g, 0.28 mol) in of THF (100 mL) was added incrementally to the THF and magnesium mixture keeping the temperature near reflux. The Grignard reaction started immediately after the addition of the first increment. The remaining solution was added over a one hour period. The resulting slurry was refluxed for an additional 30 minutes. The solution was cooled to 20° C. and a solution of 2-indanone (36.7 g. 0.28 mol) in ether (100 mL) was added dropwise over a 1 hour period. The solution was then stirred at room temperature overnight. The solution was neutralized with 1N HCl. The aqueous layer was separated and washed three times with 100 mL of ether. The organics were combined and dried over magnesium sulfate. The solvents were evaporated to yield a tan solid of the crude alcohol. This solid was taken up in acetic acid (200 mL) and cooled to 15° C. A solution of sulfuric acid (40 g) and of acetic acid (200 mL) was added slowly, keeping the temperature of the mixture near 15° C. The product separated as and oil. The acetic acid layer was diluted with 1L of ice water and extracted with toluene. The organic layer was separated and washed twice with sodium bicarbonate solution and dried over magnesium sulfate. The solvents were evaporated. The product was then taken up in a minimal amount of hexanes and passed through a short silica gel column to remove very polar material. Attempts to crystallize the product failed and the product was distilled to yield 20.5 g (22% yield), b.p. 175–180° C. @ 0.3 mm Hg. This procedure was repeated to yield an additional 22.3 grams of material. $^1$H NMR (C$_6$D$_6$): δ 7.45 (2H, s), 7.26 (1H, s), 7.13 (2H, dd), 6.94 (1H, m), 6.85 (2H, m), 3.51 (2H, s).

EXAMPLE 30

Preparation of Bis(2-(3,5-bis(trimethylsilyl)phenyl) indenyl)zirconium dichloride (Catalyst S)

2-(3,5-bis(trimethylsilyl)phenyl)indene (20.5 g, 0.061 mol), and anhydrous diethyl ether (250 mL) were placed in a 1 L three-necked flask under argon. n-Butyllithium (38 mL of 1.6 M hexane solution, 0.061 mol) was added over a thirty minute period at 0° C. The solution was stirred for an additional two hours. Zirconium tetrachloride (7.0 g, 0.03 mol), was added incrementally over a one hour period. The mixture was then stirred overnight. The ethereal solution was chilled to −10° C. and the solids were collected. The solids were taken up in 300 mL of dichloromethane and the residual solids were removed by filtration through celite. The celite was washed with an additional 100 mL of dichloromethane, and the solvents were evaporated to give 15.6 grams of product (62% yield). $^1$H NMR (C$_6$D$_6$): δ 7.75 (2H, s), 7.62 (1H, s), 6.62 (2H, m), 6.45 (2H, m), 6.41 (2H, s).

II. Polymerization

This section gives examples of polymer preparation using catalysts of this invention, including the catalysts of our aforesaid U.S. Pat. No. 5,594,080 and the novel catalysts disclosed herein and compares them to bridged catalysts.

General Procedures: Olefin Polymerization

Method A: Propylene Polymerization in Toluene. In a nitrogen filled drybox, a 300-mL stainless-steel Parr reactor equipped with a mechanical stirrer was charged with dry methylaluminoxane (MAO Type 4 Akzo, dried >24 h) dissolved in toluene. A 50-mL pressure tube was charged with the corresponding metallocene catalyst dissolved in 20 mL of toluene. The reactor was purged several times by pressurizing with propylene and venting. It was then brought to the appropriate pressure (until saturation) and temperature with stirring. The pressure tube containing the metallocene was pressurized to 200 psi with nitrogen. Once the MAO solution was saturated with propylene the catalyst solution was injected into the reactor at the appropriate temperature. After stirring for 1 hour, the polymerization was quenched by injecting methanol (10 mL). The autoclave was then slowly vented and opened. The polymer was precipitated by the addition of methanol (400 mL), collected by filtration, and dried overnight at ambient temperature.

Method B: Bulk Polymerization of Propylene. A 300-mL stainless steel Parr reactor equipped with a mechanical stirrer was evacuated, purged 4–5 times with gaseous propylene by pressurizing and venting and charged with liquid propylene (100 mL). The monomer was equilibrated at the reaction temperature and the reaction was initiated by injecting the subject zirconocene/MAO solution in toluene (20 mL) under AR pressure (250 psig, 1720 kPa). The reaction was run until a slight drop in pressure (1–2 psig, 7–14 kPa) was registered for 25–50 minutes and then quenched by injecting MeOH (20 mL). The reactor was slowly vented and opened. The polymer was precipitated in acidified MeOH (5% HCl), filtered and dried in a vacuum oven at 40° C. to constant weight.

Method C: Ethylene Homopolymerization in Toluene Solution. A 300-mL stainless steel Parr reactor equipped with a mechanical stirrer was charged with dry methylaluminoxane and toluene (80 mL). A 50-mL pressure tube was charged with the zirconocene solution in toluene (20 mL). The reactor was purged with ethylene 3–4 times by pressurizing and venting. The monomer was then equilibrated with the toluene in the reactor for 30 min at the polymerization temperature and pressure with constant stirring. The pressure tube with the metallocene solution was pressurized to 200 psig (1400 kPa) with argon and the solution was injected into the reactor. After 1 h the reaction was quenched by injecting methanol (20 mL). The reactor was slowly vented and opened. The polymer was collected by filtration and dried in a vacuum oven at 40° C. to constant weight.

Method D: Propylene Polymerization in Toluene Solution in the Presence of Ethylene-(PRE effect). A 4-L stainless steel cylinder was filled with ethylene and propylene at a certain ratio measured from the partial pressures of the two gases. The gas mixture was heated to 100° C. for 20 hours to facilitate gas mixing. The mixture was used for 2 polymerizations and then the cylinder was refilled with a new mixture.

In a nitrogen filled drybox, a 300-mL stainless steel Parr reactor equipped with a mechanical stirrer was charged with dry methylaluminoxane and 80 mL of toluene. A 50-mL pressure tube was charged with the zirconocene solution in toluene (20 mL). The reactor was purged 4–5 times with ethylene-propylene mixture by pressurizing and venting. The gas mixture was then equilibrated with the toluene in the reactor for 15 min at 15 psig (100 kPa) and 20° C. with constant stirring. The pressure tube with the metallocene solution was pressurized to 200 psig (1400 kPa) with argon and the reaction was started by injecting the catalyst. The reaction was run for 15 minutes with constant stirring and was quenched by injecting 20 mL of methanol. The reactor was then slowly vented and opened. The polymer was precipitated in acidified MeOH (5% HCl), filtered, washed with MeOH and dried in a vacuum oven at 40° C. to constant weight.

Method E: Polymerization in Liquid Propylene. A 300-mL stainless steel Parr reactor equipped with a mechanical stirrer was evacuated, purged 4–5 times with gaseous propylene by pressurizing and venting and charged with liquid propylene (100 mL). Propylene was cooled down to the reaction temperature and overpressurized with ethylene to a certain pressure. The monomer mixture was equilibrated at the reaction temperature under constant ethylene pressure for at least 10 minutes. Immediately prior to the catalyst injection the ethylene line was disconnected and the reactor was cooled to 2–3° C. below the reaction temperature to compensate for the exothermic effect upon initiation. Zirconocene/MAO solution in toluene (20 mL) was pressurized with AR to approximately 120 psi above the total pressure in the reactor). In the case of polymerizations at 0–2° C. the catalyst was cooled down in an ice bath and then injected. In the case of polymerizations at 20° C. the catalyst solution at room temperature was injected. The ethylene line was reconnected and the reaction was run for 15–60 min at constant total pressure and temperature. The reaction was quenched by injecting MeOH (20 mL), the reactor was slowly vented and opened. The polymer was precipitated in acidified MeOH (5% HCl), filtered, washed with MeOH and dried in a vacuum oven at 40 C to constant weight.

Method F: Polymerization in Liquid Propylene With Ethylene (PRE and EPE). To a 19 gallon (72 liter) reactor the following material is charged: 20.4 kg polymer grade propylene, 0.23 kg ethylene and 9.07 kg heptane after being passed over guard columns to remove moisture and dissolved oxygen. The reactor then is heated to 43.3° C., while stirring. In a dry box, 0.09 gram of metallocene catalyst Q is dissolved in 50 grams of toluene and added to 40 grams of PMAO (10.6% Al), stirred and added to a hoke cylinder. Toluene (50 grams) is used to wash the reagent remnants from the glassware into the hoke cylinder. The catalyst/cocatalyst solution is aged for a total of 30 minutes before being added to the reactor. At reactor temperature of 43.3° C., the catalyst is injected to initiate the polymerization. The temperature is allowed to increase to 48.9° C. and maintained for 3 hours. During the polymerization, 45-gram aliquots of ethylene are added every 20 minutes for a total of 590 grams of ethylene (including the initial charge). The heat of reaction is removed by evaporative cooling as well as via a reactor cooling jacket. At the end of the 3 hours, the reactor pressure is reduced to atmospheric to rapidly flash unreacted propylene and ethylene. A make up solvent, such as heptane or toluene is added to redissolve the polymer. The polymer is recovered by methanol coagulation, washed and dried to yielded 12.9 lbs of copolymer product with MFR of 1.9 g/10 min., ethylene content of 8 mole %, and Mn=119,000, Mw=358,000, Mw/Mn=3.0 (by GPC analysis).

III. Analytical Methods

Molecular weight data are obtained on a Waters 150C GPC instrument at 139° C. using 0.07% (wt/vol) solutions of the polymer in 1,2,4-trichlorobenzene using isotactic polypropylene and polyethylene as reference standards.

Isotacticity data for polypropylene was obtained from $^{13}$C NMR at 130° C. with a Varian Unity 500 MHz NMR spectrometer operating at 125 MHz, a Varian XL-400 MHz NMR spectrometer operating at 100 MHz, or a Varian UI 300 (10 mm tubes) operating at 100° C. Samples are run either as solutions of 0.25 g polymer in 2.6 mL dideuterotetrachloroethane, as 0.05 g polymer in 0.5 mL dideuterotetrachloroethane, or as a 10–12% w/w sample in 1,2,3,3-tetrachloroethane/10 vol. % 1,1,2,2-tetrachloroethane-d2. Acquisition time of 1 second with no additional delay between pulses and continuous proton decoupling were used. Sample concentration was 10–12 weight percent. All spectra were referenced using the solvent peak. The areas of the peaks in the methyl region determined from the spectral integrations were used to determine the isotacticity of the polymer.

Isotacticity data for ethylene-propylene copolymers was determined from $^{13}$C NMR performed on a Varian UI 300 in a 10 mm switchable broad band probe at 140° C. in o-dichlorobenzene/10 vol. % benzene-d6 as a solvent using gated decoupling mode. Sample concentrations of 10–12 weight percent was used. Acquisition time was set to 1 second with additional 12 second delays between pulses. Spectra were referenced to benzene-d6 peak. Spectral integrations were used to determine the copolymer composition and monomer sequence distribution.

Thermal analysis was performed by DSC, using a TA/DuPont 2100 instrument, with nitrogen purge. Sample weight was about 13 mg. Heating rate was 20° C./min. Cooling rate was 10° C./min. Peak melting endotherm temperature (Tm) and heat of fusion are typically reported from the second heat cycle. Heat of crystallization and temperature of crystallization are typically reported from the first cooling cycle.

Polymer Testing Methods

Mechanical property tests were conducted with stabilized samples in which commercial antioxidants were mixed at conventional amounts, as in the isotactic polypropylene art, before molding or extrusion. Ultranox 641 (at 0.09%), Ultranox 210 (at 0.09%) and DHT-4A (at 0.02%) were employed in this application.

Melt flow rates are determined using a Tinius Olsen Melt Flow Meter operating at 232° C. according to ASTM method D1238. In a typical experiment, 5 grams of the polymer sample is mixed with 50 mg of BHT and this mixture added to the heating chamber. A 2.0 Kg mass is attached to a plunger inserted into the heating chamber and the melt flow is determined by measuring the quantity of material extruded over a period of 1 minute. Results are reported in units of decigrams polymer/minute of flow, or grams/10 min by ASTM method D1238.

Tensile, stress relaxation and hysteresis recovery/set tests were performed with ASTM D 1708 dumbell specimens (0.9 inch gauge length) die cut from extruded film or compression molded sheets. Crosshead separation rate was 25.4 cm/m in for the hysteresis test and 51 cm/min. for the other tests.

Tensile Test: ASTM D 1708–95, ASTM D 638–96. Ultimate tensile strength (i.e. stress at break) is reported. Tensile modulus is the linear slope of the stress/strain plot at lowest elongation. In polyolefins modulus, like density, is a measure of crystallinity. Percent elongation to break is the ultimate elongation of the gauge region of the specimen at failure (break). Percent elongation (broken) is the residual set of the central 10 mm segment of the gauge region measured immediately after break, and so is a measure of recovery from highest elongation (ASTM D 412–92).

Stress Relaxation Test: ASTM E 328–96. The test specimen is deformed to the specified elongation at the specified rate, and then the decay of stress with time is measured while the specimen is held at fixed elongation. Tensile stress relaxation is reported as the decrease in stress during 5 minutes at 50% elongation (1.5×original gauge). Lower percent stress relaxation indicates better retention of recovery force during extended deformation time which is generally associated with better elastomer performance. However, stress decay occurs rapidly initially (about 4/5 during the initial 30 seconds for elastomeric polypropylene), and then decays asymptotically. Final set and stress are also reported.

Hysteresis Test: The 100% elongation hysteresis test was performed by extending the specimen to 2×original gauge length in three successive cycles of extension and recovery, with 30 second hold at 100% elongation and 60 second hold after crosshead recovery between cycles. In this hysteresis test, tensile set is reported as the cumulative set from the first two extensions, measured as the elongation at which stress exceeds the baseline on the third extension. Stress relaxation is measured as the decrease in stress (or force) during the 30 sec. that the specimen is held at extension during the first cycle. Retained force is measured as the ratio of stress at 50% elongation during the second cycle recovery to the initial stress at 100% elongation during the same cycle. Lower set indicates higher elongational recovery. Higher values of retained force and lower values of stress relaxation indicate stronger recovery force. Better general elastomeric recovery properties are indicated by low set, high retained force and low stress relaxation. In contrast, a flexible polymer is characterized as one having above about 500% elongation, tensile modulus of below about 100 MPa, but essentially no retained force (at the 50% elongation point).

EXAMPLE 30, 31

Propylene Homopolymerization with Catalyst D

Polymerizations were carried out according to Method A and the results are presented in Table 1.

TABLE 1

Propylene Polymerizations Using Complex D and MAO[a].

| Example | Pressure psig (kPa) | Productivity[d] | $M_w^e$ (×10³) | $M_w/M_n$ | [m][f] (%) | [mmmm][f] (%) |
|---|---|---|---|---|---|---|
| 30[b] | 25 (170) | 250 | 196 | 3.3 | 75 | 45 |
| 31[c] | 35 (240) | 500 | 243 | 3.2 | 78 | 51 |

[a]Conditions: [Al]/[Zr] = 1000, T = 25 C, t = 60 min.
[b][Zr] = 5.5 × 10⁻⁵ M.
[c][Zr] = 5.0 × 10⁻⁵ M.
[d]kg Polypropylene/mol. Zr/h.
[e]Determined by gel permeation chromatography versus polypropylene.
[f]Determined by ¹³C NMR spectroscopy.

EXAMPLES 32–48

Propylene Polymerization in the Presence of Ethylene

The processes of this invention include novel methods for polymerizing alpha olefins to provide elastomeric, alpha olefin polymers and copolymers, particularly propylene-ethylene (P—E) copolymers. Unexpectedly, these processes also result in significant increases in productivity and polymer molecular weight evidencing the PRE effect. Table 2 below shows the effect of ethylene on polymerization in liquid propylene using catalysts A, D, K, and M.

Viewing Table 2, in those polymerization systems containing ethylene, we observe that productivity increases by approximately an order of magnitude, as compared to those systems not containing ethylene (Examples 32, 33, 35, 38, 41, 44 and 47). Further, a 3 to 4 fold increase in molecular weight is observed for those polymers containing ethylene in percentages greater than about 14%. The ethylene enhancement factors EEF=kpp[Mp]/(kpp[h][Mp[h]] range from 2.2–7.8.

TABLE 2

Polymerizations In Liquid Propylene[a]

| Ex. | EEF | Cat. | Additive | Wt. % Et. in feed | [cat] M | $t_{rxn}$ min | T° C. | $P_{total}$, psig (kPa) | $X_e^b$ | Productivity[c] | $m_2^d$ | $M_w^e$ ×10⁻³ | MWD[e] |
|---|---|---|---|---|---|---|---|---|---|---|---|---|---|
| 32 | — | A | none | — | 1 | 25 | 0 | 76 (524) | 0 | 11920 | 65 | 835 | 5.40 |
| 33 | 1 | A | E | 7.3 | 1 | 25 | 0 | 111 (765) | 30 | 25560 | 38 | — | — |
| 34 | — | A | none | — | 1 | 25 | 19 | 117 (807) | 0 | 13200 | 60 | 549 | 3.49 |
| 35 | — | A | H₂ | — | 120 | 30 | 23 | 140 (965) | 0 | 6800 | — | — | — |
| 36 | 2.2 | A | E, H₂ | 0.6 | 120 | 60 | 23 | 140 (965) | 2 | 15776 | — | 408 | 3.7 |
| 37 | 3.2 | A | E | 4.1 | 1 | 25 | 19 | 149 (1027) | 25 | 69280 | 56 | 1789 | 2.62 |
| 38 | — | D | none | — | 1 | 25 | 0 | 74 (510) | 0 | 6000 | 76 | 756 | 5.70 |
| 39 | 7.8 | D | E | 5.2 | 1 | 25 | 1 | 102 (703) | 18 | 64540 | 81 | 2386 | 3.41 |
| 40 | 6.7 | D | E | 6.4 | 1 | 25 | 3 | 114 (786) | 30 | 75970 | 80 | 2159 | 2.99 |
| 41 | — | D | none | — | 1 | 25 | 19 | 116 (800) | 0 | 8300 | 78 | 621 | 4.58 |
| 42 | 5.3 | D | E | 3.1 | 1 | 25 | 19 | 141 (972) | 14 | 58260 | 87 | 1776 | 5.60 |
| 43 | 4.8 | D | E | 4.3 | 1 | 25 | 19 | 151 (1041) | 18 | 60160 | 88 | 1901 | 2.42 |
| 44 | — | K | none | — | 42 | 60 | 20 | 118 (814) | 0 | 363 | 33 | 55.9 | 15.3 |
| 45 | — | K | E | 3.7 | 42 | 30 | 6 | 100 (690) | 24 | 3713 | 37 | 288 | 15.1 |
| 46 | — | K | E | 6.2 | 42 | 30 | 20 | 162 (1117) | 40 | 3715 | 30 | 99.5 | 14.7 |
| 47 | — | M | none | — | 50 | 52 | 3 | 76 (524) | 0 | 1900 | 63 | 597 | 4.52 |
| 48 | — | M | E | 3.7 | 1.7 | 20 | 0 | 83 (572) | 37 | 31670 | 73 | 1254 | 3.11 |

[a]Al/Zr = 3500–10000
[b]Xe = mole % ethylene incorporated into the copolymer determined by ¹³C NMR
[c]kg · polymer/(mole · Zr · hr)
[d]for copolymers, m₂ is defined as the ratio of the area of the first methyl triplet over that of T
[e]determined by high temperature GPC

EXAMPLES 49–52

These examples show polymerizations in a toluene solution (Method D) with Catalyst L and Catalyst N. The results are presented in Table 3 below.

TABLE 3

Polymerization in Toluene Solution with Catalysts L and N.[a]

| Example | Cat. | % $E_{gas}$ | $P_{total}$ psig (kPa) | $X_E$[b] | Prod.[c] | Mw ($\times 10^3$)[d] | $M_w/M_n$ |
|---|---|---|---|---|---|---|---|
| 49 | L | 0 | 75 (520) | 0 | 143 | 68 | 5.8 |
| 50 | L | 50.0 | 15 (100) | 74.1 | 440 | 91 | 2.5 |
| 51 | N | 0 | 75 (520) | 0 | 25 | 21 | 8.9 |
| 52 | N | 27.2 | 15 (100) | 76.6 | 379 | 104 | 13.4 |

[a] Al/Zr = 1000, T = 20° C.
[b] $X_E$ = % ethylene incorporated into the copolymer determined by $^{13}$C NMR;
[c] kg · polymer/(mole · Zr · hr)
[d] determined by high temperature GPC.

The copolymers of Examples 50 and 52, exhibit significantly high productivities and molecular weights as compared to Examples 49 and 51, which were carried out in the absence of ethylene.

COMPARATIVE EXAMPLES 53–58

Polymerization with Bridged Ethylene bis (indenyl) $ZrCl_2$

Polymerizations were carried out in liquid propylene (Method E) with bridged ethylene bis (indenyl) $ZrCl_2$ and the results are presented in Table 4.

TABLE 4

Polymerizations with EBIZrCl$_2$ in liquid propylene[a]

| Ex. | EEF | Additive | [cat], M | $t_{rxn}$, min | T° C. | $P_{total}$, psig (kPa) | $X_e$[b] | Productivity[c] | $m_2$[d] | $M_w \times 10^{-3}$ | MWD |
|---|---|---|---|---|---|---|---|---|---|---|---|
| 53 | N/A | none | 1 | 25 | 0 | 74 (510) | 0 | 19100 | 92 | 98.3 | 2.13 |
| 54 | <1 | E | 2 | 55 | 2 | 86 (590) | 23 | 16457 | 100 | 78.1 | 2.14 |
| 55 | 1.7 | E | 1 | 30 | 1 | 102 (704) | 40 | 106230 | 100 | 75.5 | 1.96 |
| 56 | N/A | none | 1 | 25 | 20 | 117 (807) | 0 | 86400 | 92 | 70.6 | 1.98 |
| 57 | <1 | E | 1 | 25 | 19 | 152 (1050) | 42 | 45580 | 100 | 69.7 | 2.01 |
| 58 | 1.0 | E | 1 | 25 | 20 | 144 (993) | 39 | 243240 | 100 | 67.2 | 2.03 |

[a] Al/Zr = 3500–10000
[b] Xe = mole % ethylene incorporated into the copolymer determined by $^{13}$C NMR
[c] kg · polymer/(mole · Zr · hr)
[d] determined by high temperature GPC As these comparative examples show, there is very little effect of ethylene on the bridged catalysts ethylene bis (indenyl) $ZrCl_2$ in example 54 and 57, lower productivities were observed. Only in example 55 was a small ethylene effect observed, but this is at a polymerization temperature of 2° C., which is impractical for commercial practice.

EXAMPLES 59–66

Reactivity Ratios for Ethylene-Propylene Copolymerization

Polymerization were carried out by Method E and the results are presented in Table 5.

TABLE 5

Reactivity Ratios for Ethylene-Propylene Copolymerization

| Ex. | Cat. | T° C. | $N_{exp}$[a] | Xe/Xp in feed[b] | Xe in polymer[c] | $r_e r_p$[d] | $r_e$[d] | $r_p$[d] | $r_p/r_e$ |
|---|---|---|---|---|---|---|---|---|---|
| 59 | A | 1 | 5 | 0.06–0.22 | 21–44 | 0.92 ± 0.08 | 3.8 ± 0.3 | 0.25 ± 0.01 | 0.066 |
| 60 | A | 20 | 5 | 0.06–0.16 | 23–45 | 1.3 ± 0.2 | 5.4 ± 0.9 | 0.24 ± 0.04 | 0.044 |
| 61 | D | 2 | 5 | 0.05–0.08 | 18–43 | 1.3 ± 0.1 | 4.2 ± 0.7 | 0.31 ± 0.03 | 0.074 |
| 62 | D | 20 | 5 | 0.05–0.08 | 14–22 | 1.9 ± 0.1 | 6.0 ± 0.2 | 0.33 ± 0.03 | 0.055 |
| 63 | K | 6 | 1 | 0.06 | 24 | 0.74 | 4.6 | 0.16 | 0.035 |
| 64 | K | 20 | 2 | 0.08–0.09 | 39–41 | 0.56 ± 0.01 | 5.3 ± 0.2 | 0.11 ± 0.01 | 0.021 |

TABLE 5-continued

Reactivity Ratios for Ethylene-Propylene Copolymerization

| Ex. | Cat. | T° C. | $N_{exp}{}^a$ | Xe/Xp in feed[b] | Xe in polymer[c] | $r_e r_p{}^d$ | $r_e{}^d$ | $r_p{}^d$ | $r_p/r_e$ |
|---|---|---|---|---|---|---|---|---|---|
| 65 | EBIZrCl$_2$ | 2 | 5 | 0.04–0.18 | 23–54 | 0.49 ± 0.03 | 5.4 ± 0.6 | 0.09 ± 0.01 | 0.017 |
| 66 | EBIZrCl$_2$ | 20 | 1 | 0.07 | 42 | 0.50 | 7.1 | 0.07 | 0.010 |

[a]number of experiments used for the reactivity ratio determination
[b]the range of the ratios of the mole fractions of ethylene (Xe) and propylene (Xp) in the feed
[c]the range of E content to copolymers determined using $^{13}$C NMR
[d]determined using $^{13}$C NMR

COMPARATIVE EXAMPLES 67–71

Polymerization of Ethylene in Toluene Solution with Catalysts A, K, L, M, and N

Polymerizations were carried out in toluene and the results are presented in Table 6.

TABLE 6

Ethylene Polymerization[a]

| Example | Catalyst | | Productivity kg · PE mol · Zr · hr | Mw ×10$^{-3}$ | $M_w/M_n$ |
|---|---|---|---|---|---|
| 67 | (2PhInd)$_2$ZrCl$_2$ | A | 3570 | 2040 | 3.2 |
| 68 | rac-(1Me2PhInd)$_2$ZrCl$_2$ | K | 7280 | 1034 | 3.4 |
| 69 | meso-(1Me2PhInd)$_2$ZrCl$_2$ | L | 3050 | 1966 | 4.0 |
| 70 | Cp*(2PhInd)ZrCl2 | M | 3470 | 1883 | 4.0 |
| 71 | Cp*(1Me2PhInd)ZrCl$_2$ | N | 4810 | 1982 | 3.9 |

[a]reaction conditions: PE = 25 psig, [Zr] = 5 · 10$^{-6}$M, $t_{rxn}$ = 1 hr, T = 20 ± 1° C., [Zr]:[MAO] = 1:2750

EXAMPLES 72–79

Polymerization of Propylene with Catalysts E, Q, and S.

Polymerizations were carried out in liquid propylene and the results are presented in Table 7, Examples 72–75 in absence of ethylene, and 76–79 in the presence of ethylene showing the PRE effect. Polymer properties are presented in Table 8.

TABLE 8

Properties of Polymers Made in Presence and Absence of Ethylene Ex 72–75 without ET; Ex 76–79 with ET

| Exmpl | MFR[a] | Strength (MPa) | Modulus (MPa) | Elong. to break (%) | Stress[b] Relax (%) | Set[b] (%) | Tm, ° C. |
|---|---|---|---|---|---|---|---|
| 72 | 1.2 | 12.3 | 8.92 | 827 | 38.9 | 7 | 149 |
| 73 | 0.73 | 12.6 | 6.72 | 830 | 38.6 | 6 | 148 |
| 74 | 2.0 | 13.8 | 9.57 | 819 | 40.5 | 10 | — |
| 75 | 2.0 | 14.4 | 10.5 | 1010 | 39.7 | 11.8 | — |
| 76 | 1.0 | 20.4 | 44.3 | 988 | 49.7 | 8.7 | 84–125 |
| 77 | 2.0 | 11.9 | 10.7 | 976 | 36.1 | 7.6 | 85–125 |
| 78 | 1.9 | 15.3 | 17.4 | 1006 | 39.6 | 7.5 | 103 |
| 79 | 1.8 | 10.2 | 8.26 | 1080 | 38.5 | 6.7 | 108 |

[a]Melt flow rate (g/10 min).
[b]100% elongation.

EXAMPLES 80–85

Elastomeric Property Enhancement Effect (EPE effect)

The general procedure of Method F was followed for Examples 80–85. The reagent quantities, yields and reaction conditions are shown in Table 9. Polymer composition and properties are shown in Table 10. Examples 80 and 84 are comparative examples of homopolymers, in which ethylene was not used as a co-monomer. A smaller (7.6 liter) reactor was used for Example 84 so less reagents were used, but procedures were essentially the same as the other examples. Polymerization experiments were performed using commercially available MAO solutions having 10.1 wt. % Al (Examples 80–83 and 85) or 9.6 wt. % Al (Example 84).

TABLE 7

Preparation of Elastomeric Polyolefins in Presence and Absence of Ethylene.

| Ex | Cat | Wt. % E in feed | Zr cat. (g) | Al:Zr | Temp (° C.) | Press. psig (kPa) | Time (hr) | Yield (g) | Activity (g/g · hr)[b] | Wt. % E in polymer | MFR[a] (g/10 min.) | NMR (mm) % |
|---|---|---|---|---|---|---|---|---|---|---|---|---|
| 72 | E | 0 | 0.35 | 1100 | 37.0 | 180.0 (1241) | 2.5 | 2494 | 2848 | 0.0 | 1.2 | 37.00 |
| 73 | E | 0 | 0.35 | 1100 | 38.0 | 180.0 (1241) | 2.5 | 2444 | 2794 | 0.0 | 0.73 | 33.60 |
| 74 | E | 0 | 0.35 | 1100 | 38.0 | 180.0 (1241) | 2.5 | 4752 | 5431 | 0.0 | 1.8 | 38.10 |
| 75 | E | 0 | 0.35 | 1100 | 38.0 | 180.0 (1241) | 2.5 | 4441 | 5076 | 0.0 | 2.2 | 37.50 |
| 76 | Q | 1 | 0.015 | 1000 | 50.2 | 264.1 (1821) | 1.0 | 223.0 | 15000 | 2.2 | 1.0 | 75.2 |
| 77 | Q | 1 | 0.015 | 1000 | 49.0 | 260.8 (1798) | 1.0 | 496.6 | 33000 | 2.9 | 2.0 | 69.1 |
| 78 | S | 1.4 | 0.0152 | 1100 | 50.0 | 266.7 (1839) | 1.0 | 231.4 | 15000 | 3.2 | 2.0 | 69.9 |
| 79 | S | 1.9 | 0.015 | 1100 | 50.2 | 274.8 (1895) | 1.0 | 387.9 | 26000 | 3.3 | 1.8 | 66.3 |

[a]Melt Flow Rate (g/10 min)
[b]grams polymer per gram catalyst × hrs

TABLE 9

Polymerization Run Parameters for Homo- and Copolymerizations

| Example | Metallocene | Time (hrs) | Temp. (° C.) | Catalyst (g) | MAO (g) | [Al]/[Zr] | $C_3$ (lbs) | $C_7$ (lbs) | $C_2$ (lbs) | Yield (lbs) | Productivity (kg/g) |
|---|---|---|---|---|---|---|---|---|---|---|---|
| 80 | Q | 2 | 49 | 0.3 | 100 | 1100 | 40 | 24 | 0 | 10 | 15 |
| 81 | Q | 2 | 55 | 0.2 | 100 | 1700 | 40 | 25 | 0.9 | 12.6 | 28 |
| 82 | Q | 2 | 45 | 0.3 | 101 | 1200 | 20 | 50 | 0.5 | 12 | 18 |
| 83 | Q | 2 | 48 | 0.2 | 88 | 1500 | 50 | 10 | 1.4 | 12.7 | 29 |
| 84 | S | 1 | 40 | 0.021 | 6.5 | 930 | 6 | 0 | 0 | 0.47 | 10 |
| 85 | S | 3 | 46 | 0.2 | 110 | 1900 | 50 | 22 | 0.7 | 18.3 | 41 |

TABLE 10

Polymer Property Data for Homo- and Copolymerizations

| Examples | $C_2^+$ (mole %) in Polymer | m.p. (° C.) | MFR | Mw | Mw/Mn | NMR (m2) | m4 | Strength (MPa) | Modulus (MPa) | % Elong. Broken | % Elong. at Break |
|---|---|---|---|---|---|---|---|---|---|---|---|
| Homopolymer/ Catalyst Q | | | | | | | | | | | |
| 80 | 0 | 144 | 12.5 | 228,000 | 3.3 | (72.0) | 56.2 | 16.7 | 40.3 | 164 | 610 |
| Copolymer/ Catalyst Q | | | | | | | | | | | |
| 81 | 3.7 | 108 | 15.3 | 199,000 | 2.7 | (64.6) | — | 9.41 | 6.43 | 83 | 1174 |
| 82 | 4.0 | 103 | 10.3 | 220,000 | 3.1 | (66.6) | — | 8.69 | 10.2 | 42 | 682 |
| 83 | 1.9 | 137 | 5.3 | 283,000 | 3.0 | (70.7) | — | 15.3 | 22 | 52 | 563 |
| Homopolymer/ Catalyst S | | | | | | | | | | | |
| 84 | 0 | 144 | 6.8 | 258,000 | 2.9 | — | 62.1 | 20.1 | 95.7 | 348 | 800 |
| Copolymer/ Catalyst S | | | | | | | | | | | |
| 85 | 3.3 | 118 | 4.9 | 281,000 | 2.8 | (66.8) | — | 16.1 | 13.1 | 45 | 999 |

| Examples | Hysteresis, 30 sec. hold 100% Elongation % Stress Relax | Hysteresis, 30 sec. hold 100% Elongation % Retained Force | % Set | % Stress Relax 5 min. 50% elongation |
|---|---|---|---|---|
| Homopolymer/ Catalyst Q | | | | |
| 80 | 46.3 | 0 | 39.9 | 61.7 |
| Copolymer/ Catalyst Q | | | | |
| 81 | 38.9 | 26.3 | 7.8 | 50.2 |
| 82 | 35.9 | 28.2 | 10.4 | 46.5 |
| 83 | 42.4 | 10.6 | 19.1 | 53.9 |
| Homopolymer/ Catalyst S | | | | |
| 84 | 45.5 | 0 | 48.1 | 60.2 |
| Copolymer/ Catalyst S | | | | |
| 85 | 39.6 | 23.5 | 7.5 | 48.1 |

DISCUSSION OF EXAMPLES 33–79

The catalyst systems disclosed in this invention and in U.S. Pat. No. 5,594,080, included by reference herein polymerize propylene to elastomeric polypropylenes with productivities which range from 200–13,000 kg polymer/mol Zr hr (see Examples 30, 31, 32, 33, 35, 38, 41, 4, 47, 49 and 51). As evidence of the PRE effects, addition of ethylene to a propylene polymerization system has a dramatic and unexpectedly non-linear effect on the productivity of these catalysts. Whereas the productivity of ethylene polymerization at 25 psig (170 kPa) are in the range 3000–7280 kg polymer/mol-Zr*hr (see Examples 67–71), surprisingly the addition of 28 psig (190 kPa) of ethylene to a propylene polymerization system derived from Catalyst D results in a completely unexpected and significant 10-fold increase in productivity at 20 C (6000 to 64,540 kg polymer/mol-Zr*hr, Examples 38 and 39), clearly a non-linear effect. This means, inter alia, that catalysts that were previously considered marginal or not commercially of interest, can now be useful by using the PRE process of this invention. Indeed, if they possess other good properties, such catalysts that were formerly considered to be impractical, can now be rendered superior to other hereto faster catalysts by use in the EEF process of this invention.

The addition of ethylene into the polymerization systems of this invention leads to ethylene incorporation into the polymer. However, only an activity-enhancing amount of ethylene is required to increase the polymerization activity while simultaneously producing a high melting-temperature elastomeric polyolefin. Examples 72–75 show elastomeric homopolymers of propylene with excellent recovery properties (tensile set <12%) and stress relaxation in the range of 38–40% (100% hysteresis test). As shown in Examples 76–79, polymerization in the presence of only 1–2 weight % ethylene in the feed results in high polymerization activity and yields polyolefin elastomers with useful elastomeric properties, including melting points above 100° C., tensile set below 9% and stress relaxation in the range of 36–50%.

Moreover, as exemplified in Examples 80–85, a further aspect of the invention is the surprising observation that by adding ethylene to an unbridged fluxional metallocene polymerization system that would normally produce a flexible but non-elastomeric polyolefin results in an increase in polymerization activity and the production of useful elastomeric polymers. Comparing Example 80 with Examples 81–83, and Example 84 with Example 85, the addition of small amounts of ethylene to the polymerization increases the activity of the catalyst. In all cases, the activity of the ethylene/propylene copolymerization is higher than that of the homopolymerization in the absence of ethylene. Propylene homopolymers made with catalysts Q and S (Examples 80 and 84) exhibit yielding and drawing during deformation. They deform non-uniformly by localized necking and drawing during room temperature tensile tests at high deformation rates. These materials can be designated "flexible non-elastomeric thermoplastics" to distinguish them from "thermoplastic elastomers". Tensile set after the first two hysteresis cycles at 100% elongation is above 39% (indicating very poor recovery properties). Stress relaxation is also very high at greater than 60% as measured in the 5 minute stress relaxation test at 50% elongation. Retained force in the second cycle of the 100% elongation hysteresis test is zero. Thus, although the thermal properties of the polymers are excellent (m.p. >140° C.), and they exhibit high elongations to break (600–800%), they are not elastomeric.

Upon addition of a ethylene/propylene mixture to the activated metallocenes Q and S, a new type of polymer is produced (Examples 81–83 and Example 85). These materials are clearly elastomeric in nature: They deform uniformly to high elongations and exhibit high recovery from elongation. The tensile set after the first hysteresis cycle at 100% elongation is below 20% (in some cases below 10%), indicating good recovery properties. Stress relaxation at 50% elongation is below 55%. The retained force increases from 0 (in the homopolymer examples) to over 10% (in the copolymer examples). In some cases, the retained force of the copolymers is over 25% (with 50% retained force being the theoretical maximum). Table 10 clearly shows that as the ethylene content of the copolymers increase (from 0 to 4 mole %), the elastomeric properties of the materials improve significantly. In addition, even with ca. 4 mole % ethylene incorporation into the copolymer, the melting points of these materials are greater than 100° C.

Industrial Applicability

It is clear that there is extensive industrial applicability for the novel unbridged catalysts of this invention and the PRE effect process of increasing reactivity by including small quantities of ethylene in an olefin monomer reaction system to substantially increase the rate of reaction and overall productivity to produce high melting elastomers having excellent properties including those produced by the EPE effect process.

It is also evident that the ligands of fluxional unbridged catalysts of the present invention and percent ethylene in the feed can be selected to tailor the properties of the polymers from crystalline theromplastics to amorphous gum elastomers to thermoplastic elastomers.

As is evident from the properties reported herein, the polymers produced in fiber, film, sheet, molded, cast, or extruded product form can be used in conjunction with or place of other polymers. For example, thin film elastomeric ethylene, propylene or copolymers of ethylene and propylene produced by the catalysts and processes of this invention can be used whereever films which have conforming, elastic, resilient or sealing properties are needed.

We claim:

1. An unbridged metallocene catalyst system component for polymerization of olefins which includes at least one 2-arylindenyl ligand which is substituted on the 1-position by a substituted or unsubstituted alkyl, alkylsilyl, or aryl substituent of 1 to 30 carbon atoms.

2. A metallocene catalyst system component of claim 1 in which a 2-arylindenyl ligand is substituted on the 1-position with an alkyl group.

3. A metallocene catalyst system component of claim 1 in which a 2-arylindenyl ligand is substituted on the 1-position with an aryl group.

4. A metallocene catalyst system component of claim 1 in which a 2-arylindenyl ligand is substituted on the 1-position with an alkylsilyl group.

5. A metallocene catalyst system component of claim 1 in which a 2-arylindenyl ligand is substituted on the 1-position with a methyl group.

6. A metallocene catalyst system component of claim 1 which includes a transition metal selected from a Group 3, 4, or 5 transition metal, a lanthanide, and an actinide.

7. A metallocene catalyst system component of claim 6 in which the transition metal is selected from titanium, hafnium, vanadium, and zirconium.

8. A metallocene catalyst system component of claim 1 which contains two 2-arylindenyl ligands substituted on the 1-position.

9. A metallocene catalyst system component of claim 1 comprising a bis(1-methyl-2-phenylindenyl)zirconium dichloride.

10. A metallocene catalyst system component of claim 1 comprising (pentamethylcyclopentadienyl)(1-methyl-2-phenylindenyl)zirconium dichloride.

11. A metallocene catalyst system component of claim 1 comprising (pentamethylcyclopentadienyl)(1-methyl-2-phenylindenyl)dimethyl zirconium.

* * * * *